(12) United States Patent
Ookubo et al.

(10) Patent No.: US 8,778,143 B2
(45) Date of Patent: Jul. 15, 2014

(54) SILICON PURIFICATION METHOD AND SILICON PURIFICATION DEVICE

(75) Inventors: Yasuo Ookubo, Sammu (JP); Hiroshi Nagata, Sammu (JP)

(73) Assignee: ULVAC, Inc., Chigasaki-Shi (JP)

( * ) Notice: Subject to any disclaimer, the term of this patent is extended or adjusted under 35 U.S.C. 154(b) by 5 days.

(21) Appl. No.: 13/395,895

(22) PCT Filed: Sep. 17, 2010

(86) PCT No.: PCT/JP2010/066209
§ 371 (c)(1),
(2), (4) Date: Mar. 14, 2012

(87) PCT Pub. No.: WO2011/034172
PCT Pub. Date: Mar. 24, 2011

(65) Prior Publication Data
US 2012/0181164 A1    Jul. 19, 2012

(30) Foreign Application Priority Data

Sep. 18, 2009  (JP) ............................ P2009-217117
Sep. 18, 2009  (JP) ............................ P2009-217118
Sep. 18, 2009  (JP) ............................ P2009-217119

(51) Int. Cl.
*H05F 3/00*        (2006.01)
(52) U.S. Cl.
USPC ............ 204/164; 423/348; 423/349; 423/350

(58) Field of Classification Search
CPC ................................ H05H 1/44; C01B 33/037
USPC .......................... 204/164; 423/348, 349, 350
See application file for complete search history.

(56) References Cited

FOREIGN PATENT DOCUMENTS

| JP | 5-139713 | 6/1993 |
|---|---|---|
| JP | 6-115922 | 4/1994 |
| JP | 7-48114 | 2/1995 |
| JP | 10-203813 | 8/1998 |
| JP | 2002-29727 | 1/2002 |
| JP | 2004-125246 | 4/2004 |
| JP | 2009-136907 | 6/2009 |

OTHER PUBLICATIONS

Nakamura et al., "Boron Removal in Molten Silicon with Steam Added Plasma Melting Method", Journal of the Japan Institute of Metals, vol. 67, No. 10 (2003) pp. 583-589. English Abstract attached. No assertion of relevance is being made.
International Search Report from corresponding PCT Application No. PCT/JP2010/066209 dated Dec. 7, 2010.

*Primary Examiner* — Xiuyu Tai
(74) *Attorney, Agent, or Firm* — Grossman, Tucker, Perreault & Pfleger, PLLC

(57) ABSTRACT

The silicon purification method uses a silicon purification device including at least a crucible for loading a silicon metal and a plasma torch, and purifies the silicon metal by injecting a plasma gas from the plasma torch toward a melt surface of the silicon metal loaded in the crucible in a state where an angle formed by the melt surface and the plasma gas is set in the range of 20° to 80°.

7 Claims, 14 Drawing Sheets

SILICON PURIFICATION METHOD AND SILICON PURIFICATION DEVICE

TECHNICAL FIELD

The present invention relates to a silicon purification method and a silicon purification device for purifying a silicon metal by spraying a plasma gas on the silicon metal (base material made of silicon metal).

The present application claims priority based on Japanese Patent Application No. 2009-217117 filed in Japan on Sep. 18, 2009, Japanese Patent Application No. 2009-217118 filed in Japan on Sep. 18, 2009, and Japanese Patent Application No. 2009-217119 filed in Japan on Sep. 18, 2009, the contents of which are incorporated herein by reference.

BACKGROUND ART

At the time of purifying silicon used for a solar cell, oxidative purification is performed to remove boron (B) or contained impurities through heating by plasma arc or plasma gas (see, for example, Patent Document 1 and Non-patent Document 1). In general, silicon purification devices used in the silicon purification are categorized into two types, that is, a transferred type and a non-transferred type, depending on arrangement of the electrodes for generating the plasma arc.

The transferred type device includes a cathode electrode in a plasma torch. Only a low direct current is applied to a nozzle port of the plasma torch. An electrically conductive member provided at a bottom portion of a crucible is used as an anode electrode, and the plasma arc is generated by applying the direct current through both of the electrodes. The plasma arc is injected from the nozzle port toward the silicon metal loaded in the crucible, thereby heating the silicon metal (see, for example, Patent Document 1).

On the other hand, the non-transferred-type device includes the cathode electrode and the anode electrode in the plasma torch. The plasma arc is generated by applying a direct current through both electrodes in the plasma torch. The generated plasma arc is injected from the nozzle port, which also serves as the anode electrode, of the plasma torch toward the silicon metal loaded in the crucible, thereby heating the silicon metal (see, for example, Patent Documents 1 and 2).

In comparison between the transferred type and the non-transferred type, the plasma arc directly hits the silicon metal subjected to the heating in the transferred type, and hence, the transferred type exhibits excellent heating efficiency as compared with the non-transferred type.

In the non-transferred type, the silicon metal subjected to the heating is hit only by the plasma gas. In this case, the pinch effect, which can be seen in the transferred type, does not work and the plasma gas is not focused, so that the plasma gas after hitting the surface of the silicon melt tends to expand. It is considered that this leads to an increase in the contacting area between the plasma gas and the silicon melt surface, and increases the speed of removing the boron in the oxidative purification for removal of the boron and the like as compared with the transferred type, whereby excellent efficiency in silicon purification can be obtained.

RELATED ART DOCUMENTS

Patent Documents

Patent Document 1: Japanese Unexamined Patent Application, First Publication No. 10-203813

Patent Document 2: Japanese Unexamined Patent Application, First Publication No. 2004-125246

Non-Patent Document

Non-patent Document 1: Journal of the Japan Institute of Metals, Vol. 67, No. 10 (2003), pp. 583-589

DISCLOSURE OF THE INVENTION

Problems to be Solved by the Invention

Currently, with the increasing demand for silicon used for solar cells and the like, there is a demand to improve the efficiency in the silicon purification in which the plasma gas is sprayed onto the silicon melt surface to remove boron and the like.

The present invention has been made in view of the circumstances described above, and aims to solve a problem of providing a silicon purification method exhibiting excellent efficiency in removing boron and the like to improve the efficiency in purifying the silicon metal, and a silicon purification device capable of increasing the contact area of the plasma gas with the silicon melt surface to improve the efficiency in purifying the silicon metal.

Means for Solving the Problems

A method for purifying silicon according to the present invention uses a silicon purification device having at least a crucible for loading a silicon metal, and a plasma torch, and purifies the silicon metal by injecting a plasma gas from the plasma torch toward a melt surface of the silicon metal loaded in the crucible in a state where an angle formed by the melt surface and the plasma gas is set to be in the range of 20° to 80°.

In the method for purifying silicon according to the present invention, the silicon purification device includes plural plasma torches, and plasma gases are sprayed from the plasma torches so as to form plural recesses on the melt surface.

The method for purifying silicon according to the present invention causes a circulation flow of the melt surface.

The method for purifying silicon according to the present invention sprays the plasma gas in a forward direction of the circulation flow.

The method for purifying silicon according to the present invention sprays the plasma gases from the respective plasma torches in a tangential direction of a virtual circle A having the recesses on a circumference of the virtual circle A in a manner such that the plasma gases are aligned in one direction of the circumference of the virtual circle A.

The method for purifying silicon according to the present invention sprays the plasma gases so as to satisfy the following equation (1), where l is a radius of the virtual circle A, L is a radius of a virtual circle B having a center same as the virtual circle A and inscribed in an outer circumference of the melt surface, and i is a diameter of the recesses in a direction perpendicular to a tangent line of the virtual circle A.

[Equation 1]

$$3i \leq l \leq L - 3i \quad (1)$$

A silicon purification device according to the present invention includes a crucible for loading a silicon metal, an angle-controlling unit for controlling the advancing direction of a plasma gas, and the plasma torch that injects the plasma gas toward the melt surface of the silicon metal loaded in the crucible.

The silicon purification device according to the present invention includes plural plasma torches. In the silicon purification device, the plasma torches are arranged such that, by injecting plasma gases from the respective plasma torches, plural recesses are formed on the melt surface, and a circulation flow is caused along the recesses.

In the silicon purification device according to the present invention, directions of nozzle ports of the plasma torches are aligned in a forward direction of the circulation flow.

The silicon purification device according to the present invention includes plural plasma torches, and nozzle ports of the plasma torches are arranged such that a virtual circle A having, on a circumference thereof, plural recesses formed on the melt surface by injecting plasma gases from the plasma torches is concentric with a virtual circle F having, on a circumference thereof, points obtained by projecting the nozzle ports of the plasma torches on the melt surface.

In the silicon purification device according to the present invention, directions of the nozzle ports of the plasma torches are aligned in any one of a clockwise direction and a counterclockwise direction of the concentric circles.

In the silicon purification device according to the present invention, an angle formed by the melt surface of the silicon metal loaded in the crucible and a direction of the nozzle port of each of the plasma torches is set in the range of 20° to 80°.

In the silicon purification device according to the present invention, a supplying port for a plasma working gas, and a supplying port for an oxidation gas different from the supplying port for the plasma working gas are provided at positions near the nozzle port of the plasma torch.

A method for purifying silicon according to the present invention uses a silicon purification device including at least a crucible for loading a silicon metal, and a plasma torch. The method purifies the silicon metal by injecting a plasma gas from the plasma torch toward a melt surface of the silicon metal loaded in the crucible, and controls a melt temperature of the silicon metal to be in the range of 1700° C. to 1900° C. at the time when steam is added to the plasma gas to purify the silicon metal.

In the method for purifying silicon according to the present invention, the crucible is made of a material containing graphite as a main component.

In the method for purifying silicon according to the present invention, a ratio of a flow rate of the steam added to the plasma gas relative to the total flow rate of the plasma gas is set in the range of 15 volume % to 40 volume %.

A silicon purification device according to the present invention employs the method for purifying silicon, and further includes a supplying port for a plasma working gas, and a supplying port for steam different from the supplying port for the plasma working gas at positions near a nozzle port of the plasma torch.

A method for purifying silicon according to the present invention uses a silicon purification device including at least a crucible for loading a silicon metal, and a plasma torch. The method purifies the silicon metal by injecting a plasma gas from a nozzle port of the plasma torch toward a melt surface of the silicon metal loaded in the crucible, and keeps constant a distance from a center of a top end of the nozzle port to the melt surface in a direction of the plasma gas injected from the nozzle port.

The method for purifying silicon according to the present invention keeps the distance constant such that a radical rich area of the plasma gas is positioned at the melt surface to purify the silicon metal.

In the method for purifying silicon according to the present invention, the following equation (2) is satisfied, where L is the distance, and V is a working-gas flow rate of the plasma gas.

[Equation 2]

$$L = a \times V \quad (2)$$

(in said equation, the coefficient a represents a real number in the range of 0.75 to 2.0, a unit of L is millimeters, and a unit of V is liters/minute.)

A silicon purification device according to the present invention employing the method for purifying silicon further includes a driving unit for controlling the distance.

In the silicon purification device according to the present invention, a supplying port for a plasma working gas, and a supplying port for an oxidation gas different from the supplying port for the plasma working gas are provided at positions near a nozzle port.

Effects of the Invention

According to the method for purifying silicon of the present invention, by setting the angle formed by the melt surface of the silicon metal in a molten state and the advancing direction (incident direction) of the plasma gas in the range of 20° to 80°, the contacting area between the plasma gas and the melt surface increases. This makes it possible to efficiently oxidize and remove the impurities in the silicon metal, whereby it is possible to improve the efficiency in purifying silicon. More specifically, in the case where the formed angle is 90°, the plasma gas is sprayed vertically onto the melt surface, and the resulting recess formed on the melt surface has a circular shape. On the other hand, in the case where the formed angle is in the range of 20° to 80°, the plasma gas is sprayed obliquely on the melt surface, and the resulting recess formed on the melt surface has a substantially elliptical shape. The surface area of the substantially elliptical recess is larger than that of the circular recess. In other words, the contacting area between the plasma gas and the melt surface in the substantially elliptical recess is larger than the contacting area between the plasma gas and the melt surface in the circular recess. In general, it is considered that the impurities contained in the silicon metal are oxidized, vaporized, and removed efficiently on the surface of the recess. Thus, the silicon purification method according to the present invention and having the substantially elliptical recess formed on the silicon melt surface achieves the excellent purification efficiency as compared with the conventional silicon purification method.

In the silicon purification method according to the present invention, the silicon purification device includes plural plasma torches, and plural plasma gases are sprayed from the plural plasma torches. In this case, plural substantially elliptical recesses can be formed on the melt surface. This increases the contacting surface between the plasma gases and the melt surface, whereby it is possible to further improve the efficiency in purifying the silicon.

Further, in the silicon purification method according to the present invention, the plasma gas is sprayed so as to generate the circulation flow of the melt surface. This causes the molten silicon metal to mix in the melt surface, and causes the entire molten silicon melt to be likely to mix (convect), whereby it is possible to further improve the efficiency in purifying the silicon.

Further, in the silicon purification method according to the present invention, in the case where the plasma gas is aligned and sprayed in the forward direction of the circulation flow (clockwise or counterclockwise direction), mixture of the molten silicon metal in the melt surface occurs more easily, and mixture (convection) of the entire silicon melt is more likely to occur, whereby it is possible to further improve the efficiency in purifying the silicon.

Further, in the silicon purification method according to the present invention, the plasma gases are sprayed from the respective plasma torches in a tangential direction of the virtual circle A having the recesses on the circumference of the virtual circle A in a manner such that the plasma gases are aligned in one direction of the circumference of the virtual circle A. In this case, it is possible to generate the circulation flow having the center in the vicinity of the center of the virtual circle A in an easier manner, and to cause the molten silicon metal in the melt surface to mix in an easier manner. This makes it possible to cause the entire silicon melt to mix (convect) in an easier manner, whereby it is possible to further improve the efficiency in purifying the silicon.

Further, in the silicon purification method according to the present invention, the plural plasma gases are sprayed so as to satisfy the following equation (1), where l is a radius of the virtual circle A, L is a radius of a virtual circle B having the center same as the virtual circle A and inscribed in the outer circumference of the melt surface, and i is a diameter of each recess in a direction perpendicular to the tangent line of the virtual circle A. This makes it possible to prevent the recesses from being interfered with and disturbed by the external disturbance, and to generate the circulation flow in an easier manner. As a result, the mixture of the silicon melt surface occurs in an easier manner, and the mixture (convention) of the entire silicon melt is more likely to occur, whereby it is possible to further improve the efficiency in purifying the silicon.

The term "external disturbance" as used in the specification represents the next [phenomenon A] or [phenomenon B].

[phenomenon A]: on the melt surface, a flow of the silicon melt surface generated at one recess as well as a plasma gas flow reflecting from this silicon melt surface reach the other recess to disturb the other recess.

[phenomenon B]: on the melt surface, a flow of the silicon melt surface generated at the recess as well as a plasma gas flow reflecting from this silicon melt surface are returned back from the inner wall of the crucible generally existing at the outer circumference (outer edge) of the melt surface to disturb the recess.

The silicon purification device according to the present invention includes at least the crucible for loading the silicon metal and, the plasma torch, and injects the plasma gas from the plasma torch toward the melt surface of the silicon metal loaded in the crucible. Further, the silicon purification device includes the plasma torch having the angle-controlling unit for controlling the advancing direction of the plasma gas. With this configuration, it is possible to set the angle formed by the melt surface of the silicon melt loaded in the crucible and the advancing direction (incident direction) of the plasma gas to a predetermined angle (for example, in the range of 20° to 80°), and spray the plasma gas to the silicon melt surface, whereby it is possible to efficiently purify the silicon.

Further, the silicon purification device according to the present invention includes plural plasma torches. These plasma torches are arranged such that, by spraying the plasma gases from the respective plasma torches, the plural recesses are formed on the melt surface, and the circulation flow is generated along the plural recesses. In this case, it is possible to generate the circulation flow to mix the melt surface in an easier manner, whereby it is possible to further efficiently purify the silicon. In this case, by aligning the directions of the nozzles of the plasma torches in the forward direction of the circulation flow (direction along the circulation flow), the circulation flow gains strength, and it is possible to mix the melt surface in a much easier manner, whereby it is possible to further efficiently purify the silicon.

Further, the silicon purification device according to the present invention includes plural plasma torches, and the nozzle ports of the plasma torches are arranged such that a virtual circle A having, on a circumference thereof, plural recesses formed on the melt surface by injecting plasma gases from the plasma torches is concentric with a virtual circle F having, on a circumference thereof, points obtained by projecting the nozzle ports of the plasma torches on the melt surface. In this case, it is possible to easily spray the plasma gases in the tangential direction of the virtual circle A, and the circulation flow can be easily generated along the virtual circle A. This makes it possible to mix the melt surface in a much easier manner, whereby it is possible to further efficiently purify the silicon.

The expression "points obtained by projecting the nozzle ports on the melt surface" as used in this specification means positions located on the melt surface and corresponding to the positions of the nozzle ports when viewed in the vertical direction to the melt surface.

Further, by aligning the directions of the nozzle ports of the plasma torches in any one direction of the clockwise direction or the counterclockwise direction of the concentric circles, the circulation flow in the clockwise direction or counterclockwise direction along the virtual circle A gains strength, and the melt surface can be mixed in a much easier manner, whereby it is possible to further efficiently purify the silicon.

Further, in the silicon purification device according to the present invention, the angle formed by the melt surface of the silicon melt loaded in the crucible, and the direction of the nozzle port of the plasma torch is set in the range of 20° to 80°. With this configuration, it is possible to spray the plasma gas from the nozzle port such that the angle formed by the plasma gas and the melt surface is set in the range of 20° to 80°, and the contacting area between the plasma gas and the melt surface is increased, whereby it is possible to improve the efficiency in purifying the silicon.

Further, in the silicon purification device according to the present invention, the supplying port for the plasma working gas, and the supplying port for the oxidation gas different from the supplying port for the plasma working gas are provided for each plasma torch at positions near the nozzle port of the plasma torch. With this configuration, the oxidation gas can be supplied stably even if the angle of each of the plasma torches is changed, and each of the plasma gases sufficiently contains the radical from the oxidation gas, whereby it is possible to further efficiently purify the silicon.

In the silicon purification method according to the present invention, the silicon is purified by controlling the temperature of the crucible and the melt of the silicon metal loaded in the crucible to be in the range of 1700° C. to 1900° C. With this configuration, it is possible to enhance the efficiency in oxidizing and vaporizing the impurities in the silicon thanks to the plasma gas having the steam added therein, so that the efficiency in purifying the silicon can be improved. At this time, it is preferable to use the crucible made of a material containing graphite as a main component, because impurities are not eluted into the silicon melt from the crucible even at the above-described melt temperature.

Further, in the silicon purification method according to the present invention, by setting the flow rate of the steam added to the plasma gas in the range of 15 volume % to 40 volume % of the total flow rate of the plasma gas, it is possible to sufficiently oxidize the boron or other impurities contained in the silicon metal.

Further, in the silicon purification device according to the present invention, the supplying port for the plasma working gas, and the supplying port for the steam different from the supplying port for the plasma working gas are provided at positions near the top end of the nozzle port (spraying port) of the plasma torch. In this case, the steam is efficiently added in the plasma gas, so that the plasma gas can contain the large amount of radical such as OH radical. By using the plasma gas having the large amount of radical, the efficiency in purifying the silicon is further improved.

In the silicon purification method according to the present invention, the silicon metal is purified by spraying the plasma gas onto the melt surface while keeping constant the distance between the center of the top end of the nozzle port of the plasma torch and the melt surface of the silicon metal in the molten state. With this configuration, even if the melt surface lowers due to the vaporization of the silicon metal during the purification, the amount of plasma gas sprayed onto the melt surface during the purification does not change, whereby the silicon can be purified efficiently.

Further, in the silicon purification method according to the present invention, the silicon metal is purified by spraying the plasma gas onto the melt surface so as to position the radical-rich area of the plasma gas at the melt surface of the silicon in the molten state. With this configuration, the oxidative reaction and the removal of the impurities in the melt surface is further enhanced, whereby the efficiency in purifying the silicon is further improved. At this time, as the distance between the center of the top end of the nozzle port and the melt surface is kept constant, it is possible to constantly spray the radical-rich area to the melt surface at all times during the purification, whereby it is possible to maintain the efficiency in purifying the silicon at a significantly high level.

Further, in the silicon purification method according to the present invention, the silicon metal is purified by setting the relative position between the plasma torch and the melt surface so as to satisfy the equation (2), and maintaining the set position, whereby it is possible to sufficiently position the radical-rich area at the melt surface.

The silicon purification device according to the present invention includes the driving unit for moving downward the position of the plasma torch or moving upward the position of the crucible according to the lowering of the melt surface due to the vaporization of the silicon metal during the purification. Thus, it is possible to keep constant the amount of plasma gas sprayed onto the melt surface during the purification, the incident angle of the plasma gas relative to the melt surface, and the distance between the center of the top end of the nozzle port (spraying port) of the plasma torch and the melt surface, so that the silicon can be purified efficiently.

Further, the silicon purification device according to the present invention includes the supplying port for the plasma working gas, and the supplying port for the oxidation gas different from the supplying port for the plasma working gas at positions near the top end of the nozzle port (spraying port) of the plasma torch. In this case, the oxidation gas can be efficiently added to the plasma flame, and thus, the radical-rich area (containing the large amount of radical) is likely to be formed in the generated plasma gas. By using the plasma gas containing the above-described radical, the efficiency in purifying the silicon further improves.

EMBODIMENTS OF THE INVENTION

Hereinbelow, on the basis of preferred embodiments, the present invention will be described with reference to the drawings. However, the present invention is not limited to this. Various modifications are possible without departing from the scope of the present invention.

First Embodiment

A first embodiment of the present invention will be described.

Figure 1:
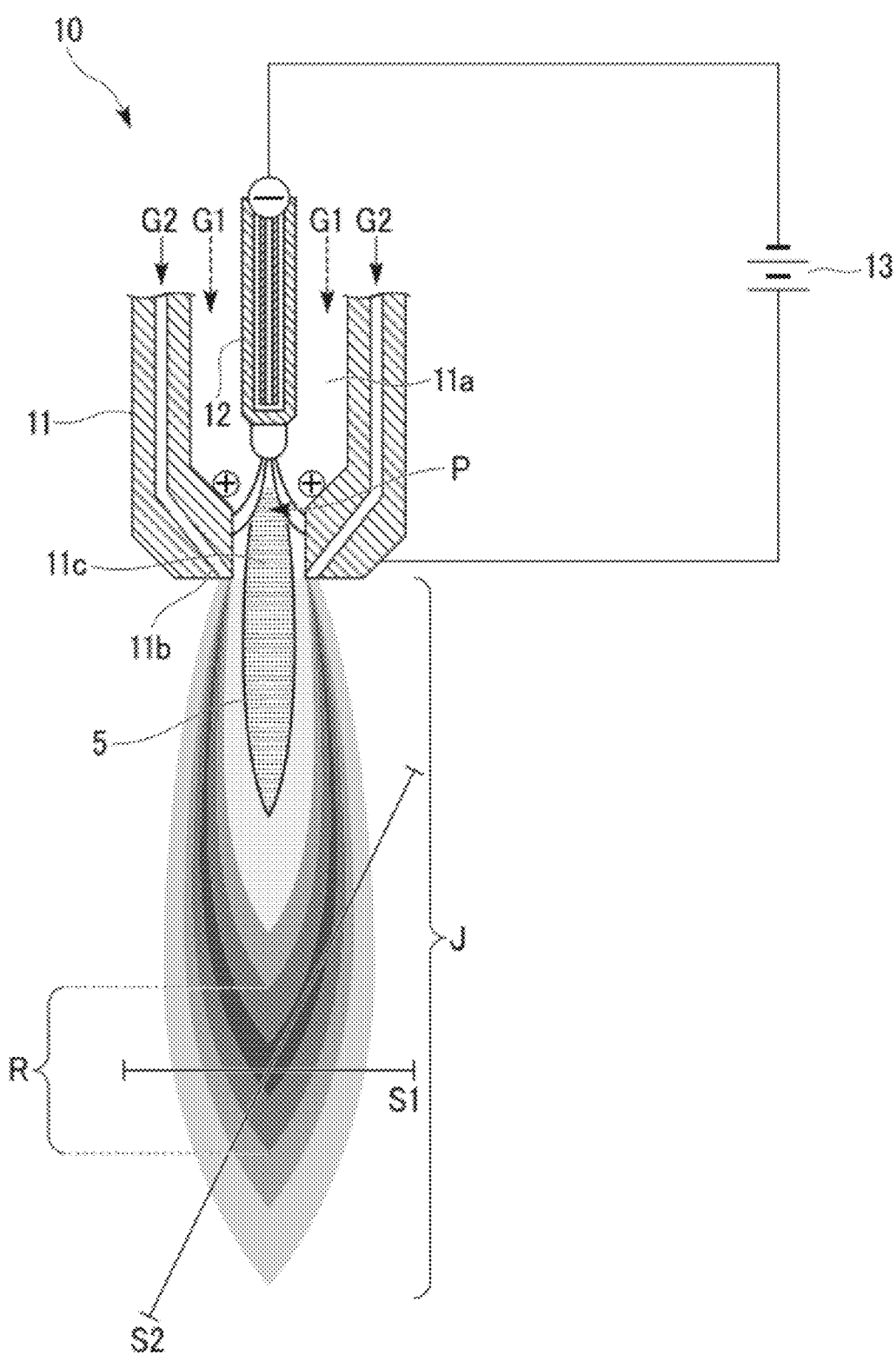
FIG. 1 is a schematic sectional view illustrating a configuration example of a plasma torch in a silicon purification device according to the present invention, and a plasma gas injected from the plasma torch.

FIG. 1 is a schematic sectional view illustrating a configuration example of a plasma torch 10 in a silicon purification device 1 applicable to a silicon purification method according to the present invention and explaining a plasma gas J injected from the plasma torch 10.

The plasma torch 10 includes an anode electrode 11, a cathode electrode 12, a plasma-working-gas supplying port 11a, and an oxidation-gas supplying port 11b.

In a space surrounded by the anode electrode 11, the plasma-working-gas supplying port (supplying path) 11a for supplying a plasma working gas (inert gas) G1 to a nozzle port 11c of the plasma torch 10 is formed. As the plasma working gas G1, an argon (Ar) gas is employed in this embodiment. Further, although not illustrated in the drawing, a cooling unit for preventing the anode electrode 11 from overheating may be provided in the vicinity of the anode electrode 11 (near the anode electrode 11) or inside of the anode electrode 11.

Further, as the plasma working gas G1, it may be possible to employ an inert gas such as an argon (Ar) gas, or a mixture gas in which a hydrogen ($H_2$) gas is mixed with the argon gas, or the like. By mixing the hydrogen gas with the argon gas, it is possible to improve the efficiency in removing the impurities in the silicon metal through the oxidation of the impurities.

The cathode electrode 12 is provided in the space surrounded by the anode electrode 11. The cathode electrode 12 is insulated from the anode electrode 11, is electrically connected with the negative pole of the direct-current power supply 13, and radiates thermo electrons for generating a plasma arc P with the anode electrode 11.

By supplying the argon gas serving as the plasma working gas G1 from the plasma-working-gas supplying port 11a to the nozzle port 11c while generating the plasma arc P, the plasma flame 5 containing the plasma gas is injected from the nozzle port 11c.

The anode electrode 11 includes the plasma-working-gas supplying port 11a, and the oxidation-gas supplying port 11b provided at a position different from the plasma-working-gas supplying port 11a and supplying an oxidation gas G2 to the vicinity of the nozzle port 11c of the plasma torch 10 (near the nozzle port 11c). The oxidation gas G2 includes, for example, steam, carbon monoxide gas, and oxygen gas. Steam is employed in this embodiment. By adding the steam to the plasma gas by a predetermined volume %, the plasma gas J containing the large amount of OH radical together with the plasma flame 5 are injected from the nozzle port 11c.

The expression "adding the steam (oxidation gas G2) by a predetermined volume %" as used herein means a ratio of the steam with respect to the sum total (plasma gas) of the volume of the argon gas (plasma working gas G1) and the volume of the steam. For example, in the case where the steam with the flow rate of 20 L/min is added to the plasma working gas with the flow rate of 80 L/min, the total flow rate of the plasma gas is 100 L/min. In this case, the steam is added by 20 volume %.

As the method for supplying the steam, it is preferable to add the steam from the vicinity of the nozzle port 11c of the anode electrode 11, in other words, from the oxidation-gas supplying port 11b provided near the nozzle port 11c as illustrated in FIG. 1. By adding the steam through the method described above, it is possible to efficiently form a radical-rich area R, which will be described later, in the plasma gas.

As another method, it may be possible to employ a method in which a nozzle of a steam (oxidation gas G2) supplying device, which is provided separately from the plasma torch 10, is disposed so as to be targeted at the plasma gas to add the steam in the plasma gas.

The concentration distribution of the OH radical (radical of oxidation gas) in the plasma gas J is illustrated in FIG. 1 as stepwise gradation for the purpose of convenience. However, it is considered that, in reality, the concentration distribution gradually changes. More specifically, the concentration distribution of the OH radical can be expressed as a normal distribution having a peak at a center of the area R illustrated in FIG. 1, when viewed in the direction from the top end of the plasma flame 5 toward the top end of the plasma gas J. Thus, the area denoted by R in FIG. 1 is an area having the largest amount of radical in the radical-rich plasma gas J. The area R is referred to as a radical-rich area R in this specification.

It should be noted that the concentration distribution of the radical in the plasma gas J can be examined through an optical measurement method employing, for example, a high-speed gate camera having an image intensifier and CCD elements.

Figure 2:
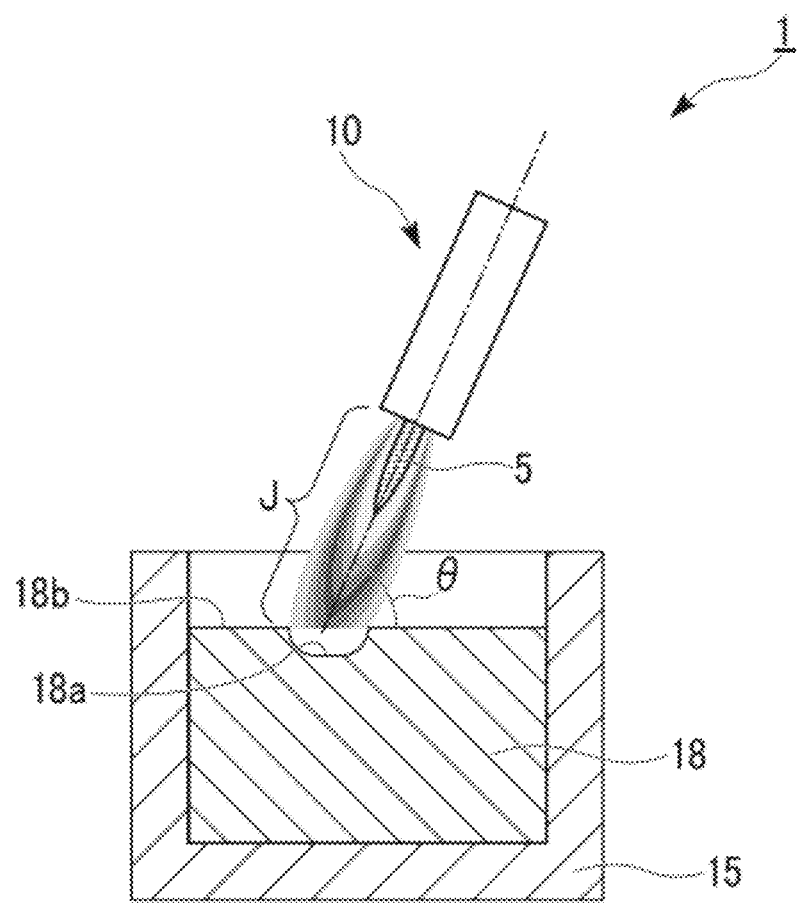
FIG. 2 is schematic sectional view illustrating a relationship of relative positions between a melt surface of a silicon metal and the plasma torch as well as the plasma gas in the silicon purification device according to the present invention.

FIG. 2 is schematic sectional view illustrating a relationship of relative positions between the plasma gas J injected from the plasma torch 10 in the silicon purification device 1 applicable to the silicon purification method according to the present invention and a melt surface 18b of the silicon metal 18.

The crucible 15 is disposed directly below the plasma torch 10, and contains the silicon metal 18. The silicon metal 18 may be heated with the plasma gas J into a melt state, or may be molten with another method (for example, high frequency induction heating employing an induction coil). As the crucible 15, it is preferable to employ a crucible made of graphite.

As the base material of the silicon metal 18, it is preferable to employ a silicon base material used for photoelectric conversion elements of solar cell. In general, the silicon base material contains boron of about 10 ppm as an impurity, and it is desirable to purify the silicon metal such that the boron concentration is not more than 0.3 ppm.

In FIG. 2, the nozzle port of the plasma torch 10 is targeted at the crucible 15 so as to spray the plasma gas J onto the melt surface 18b. In this embodiment, θ represents an angle formed by the plasma gas J and the melt surface 18b (elevation angle at which the entering direction of the plasma gas J is looked up from the melt surface 18b). In other words, the plasma gas J is sprayed so as to enter the melt surface 18b at an angle θ relative to the melt surface 18b.

A recess 18a is formed on the melt surface 18b on which the plasma gas J is sprayed. In the case where the above-described angle is 90°, the shape of the recess 18a is a circle.

In the case where the above-described angle is in the rage of 20° to 80°, the recess 18a has a substantially elliptical shape.

It should be note that, in the specification, the substantially elliptical shape represents a plane shape of the recess 18a formed on the melt surface 18b by the spraying of the plasma gas J at a height of the melt surface 18b. The substantially elliptical shape includes a perfect ellipse approximated to the substantially elliptical shape.

In comparison between the circular recess 18a and the substantially elliptical recess 18a, the surface area of the substantial elliptical recess 18a is larger than that of the circular recess 18a. This can be understood from a line segment S1 and a line segment S2 illustrated in FIG. 1. More specifically, in the case where the angle $\theta$ is set to 90° and the line segment S1 of the plasma gas J is positioned at the melt surface 18b, the size of the plasma gas J at the line segment S1 is almost equal to a diameter of the circular recess 18a. Further, in the case where the angle $\theta$ is set to about 60° and the line segment S2 of the plasma gas J is positioned at the melt surface 18b, the size of the plasma gas J at the line segment S2 is almost equal to a major axis of the substantially elliptical recess 18a (length of the major axis of an ellipse approximate to the substantially elliptic shape). In this specification, in comparison between the line segment S1 and the line segment S2, the line segment S2 is obviously longer than the line segment S1, and thus, the surface area of the substantially elliptical recess 18a is larger than that of the circular recess 18a.

As described above, in the present invention, by setting the angle $\theta$ in the range of 20° to 80°, it is possible to form the substantially elliptical recess 18a through the spraying of the plasma gas J on the melt surface 18b, so that the contacting area between the plasma gas J and the melt surface 18b can be increased. At the surface of the melt surface 18b contacting with the plasma gas J, oxidation reaction of impurities in the silicon metal 18 occurs. Thus, as compared with the case of the angle $\theta$ being set to 90°, the plasma gas J can be efficiently brought into contact with the melt surface 18b in the case of the angle $\theta$ being set in the range of 20° to 80°, whereby it is possible to improve the efficiency in purifying the silicon.

As the angle $\theta$ in the silicon purification method according to the present invention, it is preferable to set the angle $\theta$ in the range of 30° to 70° in the range of 20° to 80°, and further preferable to set the angle $\theta$ in the range of 40° to 60°. By setting the angle $\theta$ in the above-described range, it is possible to further improve the efficiency in purifying the silicon.

At the time when the plasma gas J is sprayed on the melt surface 18b, it is desirable to adjust the distance between the plasma torch 10 and the melt surface 18b as appropriate so as to position the radical-rich area R in the plasma gas J at the melt surface 18b. By forming the recess 18a using the radical-rich area R, the radical (OH radical and the like) contained in the plasma gas J can be further efficiently brought into contact with the melt surface 18b, whereby it is possible to further improve the efficiency in purifying the silicon through the oxidation reaction of the impurities in the silicon metal 18.

As a mechanism of removing boron or other impurities in the silicon metal 18, it is considered that, on the surface of the recess 18a formed on the melt surface 18b with the plasma gas J having the oxidation gas G2 added therein, boron and the like are oxidized with at least the oxidation gas G2 and radical from the oxidation gas G2 (for example, OH radical), and then, the oxidized boron is vaporized and removed.

As the oxidation gas G2, steam is preferable because the efficiency in removing the impurities in the silicon metal 18 is high, handleability is relatively easy, and safety is high.

In the silicon purification method according to the present invention, it is preferable to use the silicon purification device 1 having plural plasma torches 10. By spraying plural plasma gases J from the plural plasma torches 10 to the melt surface 18b, it is possible to form plural substantially elliptical recesses 18a on the melt surface 18b, whereby it is possible to further improve the efficiency in purifying the silicon as compared with spraying the plasma gas from the single plasma torch 10.

The angles $\theta$ of the plural plasma torches 10 may be set differently from each other, or may be set equally to each other, as long as the angles $\theta$ fall within the range of 20° to 80°.

The flow rates of the plasma gases J (flow rates of the plasma working gases G1) injected from the plural plasma torches 10, and the amount of steam added to the plasma gases J (amount of the oxidation gas G2) may be set differently, or may be set equally.

Further, in the silicon purification method according to the present invention, it is preferable to generate a circulation flow at least in the melt surface 18b by spraying the plural plasma gases J. With this circulation flow, it is possible to generate a flow that mixes the silicon melt 18 in the melt surface 18b, whereby it is possible to further enhance the mixing effect caused by the convection due to heating of the silicon in the melt surface 18b by the plasma gases J. This makes the mixture of the entire silicon melt 18 likely to occur, whereby it is possible to further improve the efficiency in purifying the silicon.

The circulation flow represents a circular flow or spiral flow. The circulation flow may be a circular or spiral flow having a specific center and a specific size, or may be a circulation flow or spiral flow having a center located at an unspecified position and having a size that continuously varies. An example of the circular flow or spiral flow includes a circular flow or spiral flow having a center of the circulation flow located in the vicinity of the center of the melt surface and having a radius of half of a distance from the center of the circulation flow to the outer circumference (outer edge) of the melt surface.

The circulation flow may be generated by spraying the plasma gas J from the single plasma torch 10. However, by spraying the plasma gases J from the plural plasma torches 10, it is possible to generate the circulation flow in a more efficient manner. At this time, it is desirable to appropriately adjust the relative position of the plasma gases J from the plural plasma torches 10 and the spraying directions of the plural plasma torches 10. The adjustment method will be described below.

In the silicon purification method according to the present invention, it is preferable to spray the plasma gases J in the forward direction of the circulation flow (direction along the flow direction of the circulation flow). By aligning and spraying the plural plasma gases J in the forward direction, the circulation flow gains strength, whereby it is possible to enhance the efficiency in mixing the melt surface, and the efficiency in purifying the silicon.

In the silicon purification method according to the present invention, it is preferable to, by spraying the plural plasma gases, virtually set a virtual circle A having a circumference on which plural substantially elliptical recesses 18a formed on the melt surface 18b are located, and align and spray the plural plasma gases J in a tangential direction of the virtual circle A and toward one direction along the circumference of the virtual circle A (for example, in the forward direction of the circulation flow).

In the case where the plural plasma gases are sprayed as described above, it becomes easy to generate the flow that mixes the silicon melt 18 in the melt surface 18b, whereby it is possible to further enhance the mixing effect obtained by the convection caused by the heating of the silicon at the melt surface 18b with the plasma gases J. Further, at the melt surface 18b, it becomes easy to generate the circulation flow having the center located in the vicinity of the center of the virtual circle A. This makes the mixture of the entire silicon melt 18 more likely to occur, whereby it is possible to further improve the efficiency in purifying the silicon.

Here, it is preferable that the substantially elliptical recesses 18a located on the circumference of the virtual circle A be each disposed such that an intersection point of the minor axis and the major axis of the substantial ellipse is located on this circumference of the virtual circle A. However, it is only necessary that the center portion of the substantial ellipse is located on the circumference.

Further, it is preferable that all the plural substantially elliptical recesses 18a formed on the melt surface be located on the circumference of the virtual circle A. However, it may be possible to employ a configuration in which a part of the recesses 18a not be located on the circumference of the virtual circle A.

Figure 3A:
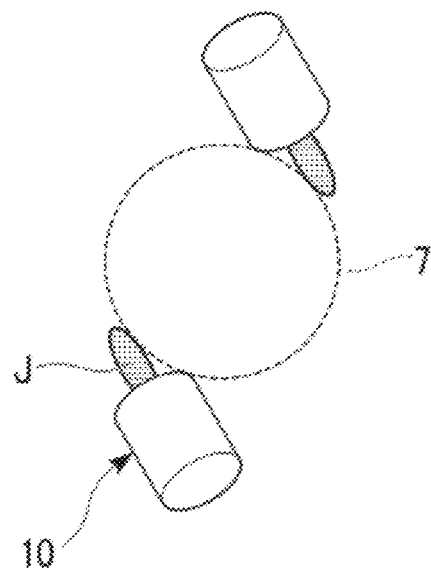
FIG. 3A is a schematic view exemplifying a positional relationship between plasma torches and a virtual circle A at the time when the plural plasma torches spray plasma gases in a tangential direction of the virtual circle A.
Figure 3B:
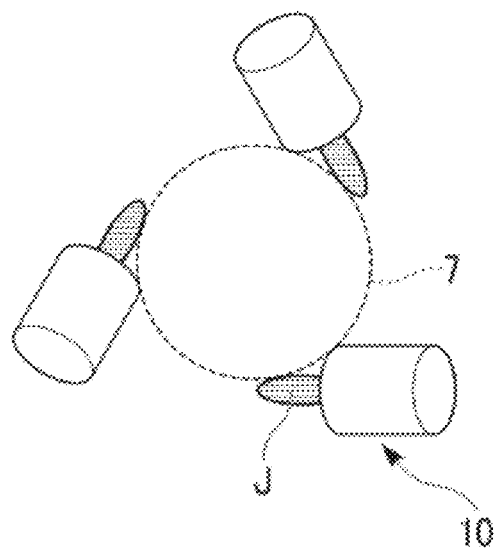
FIG. 3B is a schematic view exemplifying a positional relationship between plasma torches and a virtual circle A at the time when the plural plasma torches spray plasma gases in the tangential direction of the virtual circle A.
Figure 3C:
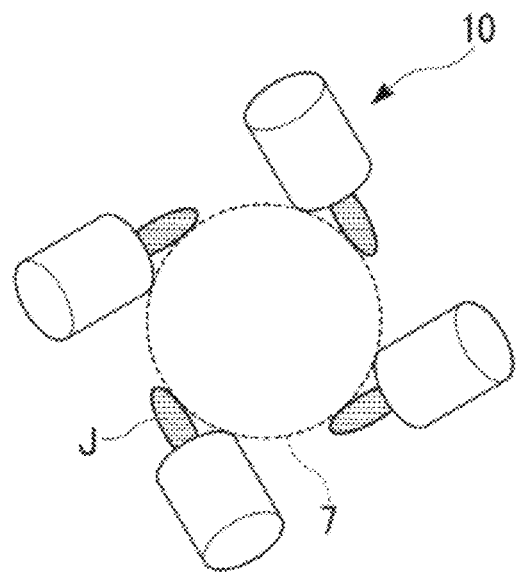
FIG. 3C is a schematic view exemplifying a positional relationship between plasma torches and a virtual circle A at the time when the plural plasma torches spray plasma gases in the tangential direction of the virtual circle A.

FIG. 3A through FIG. 3C illustrate examples of the virtual circle A.

In FIG. 3A, nozzle ports of two plasma torch 10 are arranged such that a virtual circle F (not illustrated) having a circumference on which the nozzle ports of the two plasma torches 10 are projected on the melt surface 18b (corresponding to a paper surface in the drawing) and the virtual circle A (reference numeral 7 in the drawing) having a circumference on which plural recesses (not illustrated) formed on the melt surface 18b by the injection of the plasma gases J from the plasma torches 10 are set in a concentric manner. The plasma gases J are aligned and sprayed in a tangential direction of the virtual circle A and in the clockwise direction with respect to the circumference of the virtual circle A.

By arranging the plasma torches and spraying the plasma gases J as described above, it is possible to generate the circulation flow in the clockwise direction and along the plural recesses on the virtual circle A.

In FIG. 3B, nozzle ports of three plasma torches 10 are arrange such that the virtual circle F (not illustrated) having a circumference on which the nozzle ports of the three plasma torches 10 are projected on the melt surface 18b (corresponding to a paper surface in the drawing) and the virtual circle A (reference numeral 7 in the drawing) having a circumference on which plural recesses (not illustrated) formed on the melt surface 18b by the injection of the plasma gases J from the plasma torches 10 are set in a concentric manner. The plasma gases J are aligned and sprayed in a tangential direction of the virtual circle A and in the clockwise direction with respect to the circumference of the virtual circle A.

By arranging the plasma torches and spraying the plasma gases J as described above, it is possible to generate the circulation flow in the clockwise direction and along the plural recesses on the virtual circle A.

In FIG. 3C, nozzle ports of four plasma torches 10 are arrange such that the virtual circle F (not illustrated) having a circumference on which the nozzle ports of the four plasma torches 10 are projected on the melt surface 18b (corresponding to a paper surface in the drawing) and the virtual circle A (reference numeral 7 in the drawing) having a circumference on which plural recesses (not illustrated) formed on the melt surface 18b by the injection of the plasma gases J from the plasma torches 10 are set in a concentric manner. The plasma gases J are aligned and sprayed in a tangential direction of the virtual circle A and in the clockwise direction with respect to the circumference of the virtual circle A.

By arranging the plasma torches and spraying the plasma gases J as described above, it is possible to generate the circulation flow in the clockwise direction and along the plural recesses on the virtual circle A.

Here, the contacting points between the plasma gases J and the melt surface 18b are located on the virtual circle A, and at the respective contacting points, the substantially elliptical recesses 18a are formed (the recesses 18a are not illustrated in FIG. 3A to FIG. 3C). Further, the distances between the contacting points on the virtual circle A are equal. More specifically, on the virtual circle A in each of FIG. 3A to FIG. 3C, the chords joining the contacting points on the circumference have the same length.

Figure 4:
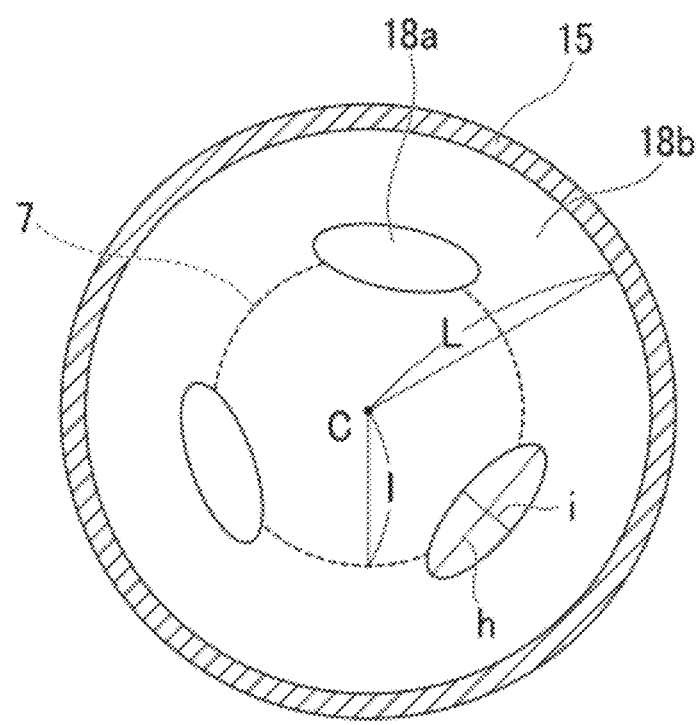
FIG. 4 is a schematic view illustrating elliptical recesses formed on the surface of the silicon metal melt loaded in a crucible.

In the silicon purification method according to the present invention, as illustrated in FIG. 4, it is preferable that the plural plasma gases J be sprayed so as to satisfy the following equation (3), where l is a radius of the virtual circle A, L is a radius of a virtual circle B (inner circumference of the crucible 15 in the drawing) having the same center C as the virtual circle A and inscribed in an outer circumference (outer edge) of the melt surface 18b, and i is a diameter (minor diameter of the substantial ellipse) in a direction perpendicular to the tangent line of the virtual circle A of the substantially elliptical recesses 18a.

[Equation 3]

$$3i \leq l \leq L - 3i \quad (3)$$

Here, the equation (3) means that the intersection point of the minor axis and the major axis of the substantial ellipse on the circumference of the virtual circle A is spaced from the center of the crucible 15 by three times (3i) or more the minor diameter i, which is a length of the minor axis of the substantial ellipse, and is spaced from the inner wall of the crucible 15 by 3i or more.

It should be noted that, for example, in the case where the crucible 15 has a quadrangle shape and the outer circumference of the melt surface 18b has a quadrangle shape, the virtual circle B is a circle inscribed in the quadrangle. Further, it is only necessary that the virtual circle B is inscribed in the outer circumference of the melt surface at one or more points, and the virtual circle B is not necessarily inscribed in the outer circumference at plural points.

In the case where the equation (3) is satisfied and the minor axis (minor diameter i) extends toward the center C as illustrated in FIG. 4, the extension line passes through the center C. Further, in FIG. 4, a direction of the major axis (major diameter) h of each of the substantially elliptical recesses 18a corresponds to a direction of spraying the plasma gas J as viewed from the vertical direction of the melt surface 18b. In other words, the direction indicated by the reference character h corresponds to a direction of the plasma gas J in the case where the plasma gas J is projected on the melt surface 18b.

By spraying the plural plasma gases J so as to satisfy the equation (3) to form the plural substantially elliptical recesses 18a on the melt surface 18b, it is possible to prevent the plural substantially elliptical recesses 18a from being disturbed due to the interference of external disturbance, whereby it becomes further easy to generate the circulation flow having the center located in the vicinity of the virtual circle A. This makes it possible to cause the mixture of the silicon melt surface. Further, this makes the mixture of the entire silicon melt 18 even more likely to occur, whereby it is possible to even further improve the efficiency in purifying the silicon.

The term external disturbance as used herein refers to the following [phenomenon A] or [phenomenon B].

[phenomenon A]: on the melt surface 18b, a flow of the silicon melt surface 18b generated at one substantially elliptical recess 18a and a plasma gas flow reflecting from the melt surface 18b reach the other substantially elliptical recess 18a to disturb the other recess 18a.

[phenomenon B]: on the melt surface 18b, a flow of the silicon melt surface 18b generated at the substantially elliptical recess 18a and a plasma gas flow reflecting from the melt surface 18b are returned back from the wall of the crucible 15 generally existing at the outer circumference (outer edge) of the melt surface 18b to disturb the substantially elliptical recess 18a.

An example of the [phenomenon A] includes a case where the plural substantially elliptical recesses 18a are each located in the vicinity of the center C, and cause the disturbance to each other.

Further, even if the equation (3) is satisfied, the disturbance of the [phenomenon A] possibly occurs in the case where the recesses 18a of the virtual circle A are located near each other. To prevent the disturbance, it is preferable that the intersection points of the major axis and the minor axis of the substantially elliptical recesses 18a be spaced from each other with sufficient distances on the circumference of the virtual circle A so as not to cause disturbances to each other, and it is more preferable that the distances of the intersection points be equal (in other words, lengths of all the chords joining the intersection points located on the circumference are equal).

Figure 5:
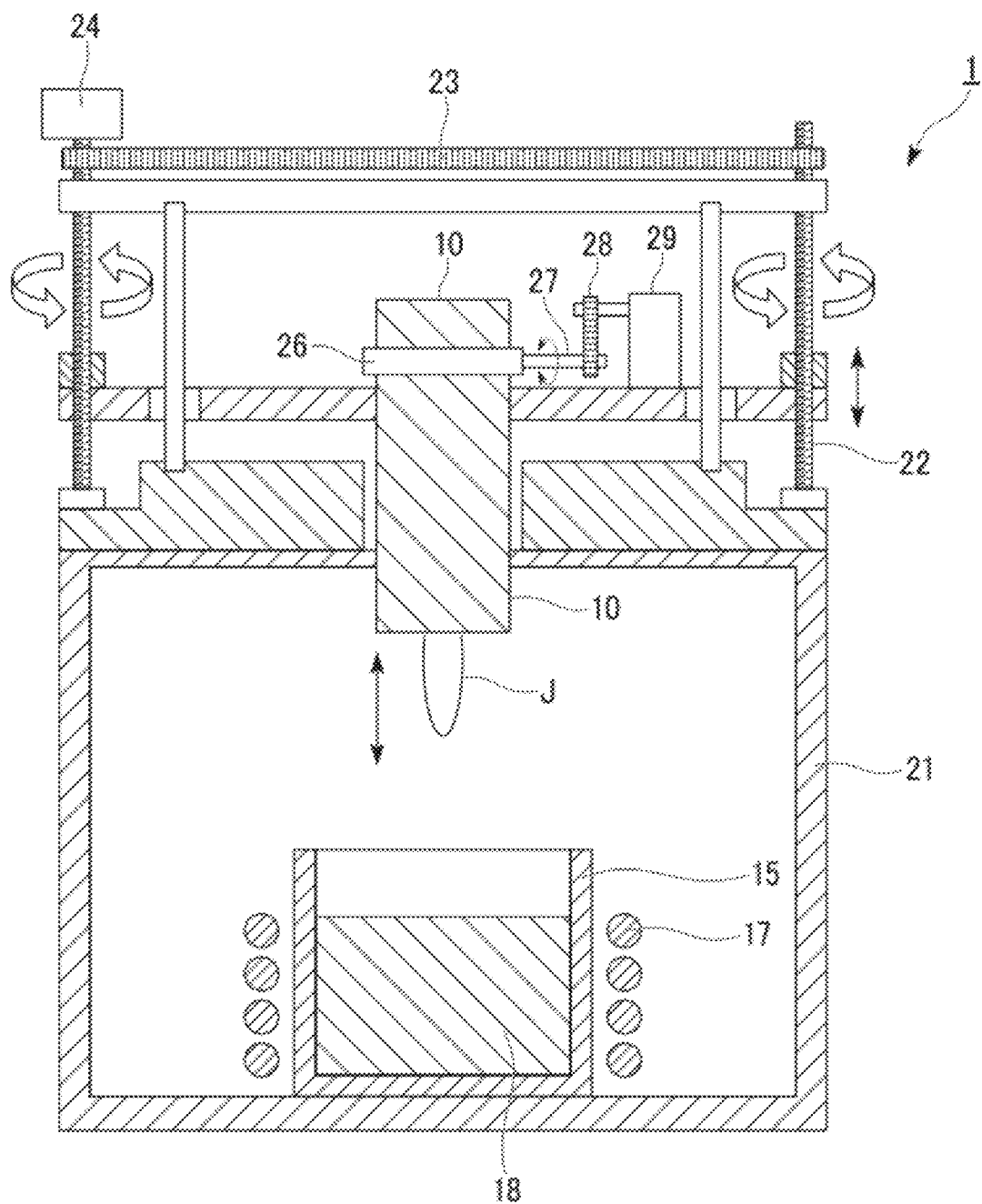
FIG. 5 is a schematic sectional view for explaining a configuration example of the silicon purification device according to the present invention and operations thereof.

FIG. 5 is a schematic sectional view for explaining a configuration example of the silicon purification device 1 applicable to the silicon purification method according to the present invention, and operations thereof. The plasma torch 10 is disposed vertically above the crucible 15 having the induction coil 17 wound therearound, and is connected to a driving unit for moving upward and downward the plasma torch 10 in a vertical direction. The driving unit is placed on a base 21. Further, the plasma torch 10 is provided with an angle-controlling unit for adjusting an angle of the plasma torch 10 to control the advancing direction of the plasma gas J between the frontward and the backward of the paper.

The driving unit in FIG. 5 includes a ball screw 22, a belt 23, and a motor 24. The driving force of the motor 24 rotates the ball screw 22 through the belt 23 to move upward and downward a shaft connected to the ball screw in the vertical direction. The plasma torch 10 is connected with the shaft, and hence, by controlling the rotation of the motor 24, it is possible to bring the plasma torch 10 close to or away from the silicon metal 18 loaded in the crucible 15. In other words, by controlling the driving unit, it is possible to adjust a distance D from a center of a top end of the nozzle port 11c of the plasma torch 10 to the melt surface 18b of the silicon metal 18 to be a predetermined distance.

The angle-controlling unit in FIG. 5 includes a torch holder 26, an arm 27, a belt 28, and a motor 29. The driving force of the motor 29 rotates the arm 27 through the belt 28 to adjust the angle of the plasma torch 10 held by the torch holder 26 in the frontward and the backward with respect to the paper. In other words, by controlling the angle-controlling unit, it is possible to control the angle of the plasma torch 10 relative to the melt surface 18b, whereby it is possible to adjust the angle θ to be a predetermined angle.

It is preferable that the silicon purification device 1 according to the present invention and having the driving unit as described above operate and control so as to keep the distance D constant during the purification of the silicon. Methods of this operation together with a procedure of purifying the silicon using the silicon purification device 1 will be described.

First, the silicon metal (base material made of the silicon metal) 18 is loaded in the crucible 15. Then, the silicon metal 18 is molten through a high frequency induction heating with the induction coil 17. The melting is determined to be complete when the silicon metal 18 reaches 1420° C. or more and no block-like silicon can be seen.

It is preferable to perform the oxidative purification at a silicon melt temperature in the range of 1500° C. to 1900° C. This is because, in the case where the temperature is less than 1500° C., the silicon melt is likely to be covered with silica ($SiO_2$) due to influence of the steam sprayed for the oxidative purification, which leads to a reduction in the speed of removing boron. On the other hand, the excessively high silicon melt temperature leads to a decrease in the speed of removing boron, and hence, it is desirable to set the temperature to 1900° C. or lower.

Next, by controlling the angle-controlling unit, an angle of the plasma torch 10 with respect to the melt surface 18b is adjusted such that the angle θ becomes a predetermined angle. Then, by controlling the driving unit, the plasma torch 10 is brought close to the melt surface 18b; the plasma torch 10 is positioned at a predetermined position; the plasma working gas G1 (Ar gas) is supplied; the oxidation gas G2 (steam) is added; and the plasma gas J is sprayed from the nozzle port 11c of the plasma torch 10 to the melt surface 18b.

At this time, by positioning the plasma torch 10 at a predetermined position so as to locate the radical-rich area R of the plasma gas J at the melt surface 18b, the purification efficiency can be further improved. As the method for this, it is preferable that the plasma torch 10 be disposed so as to satisfy the following equation (4) between the distance D from the center of the top end of the nozzle port 11c of the plasma torch 10 to the melt surface 18b, and the flow rate V of the plasma working gas G1.

[Equation 4]

$$D = a \times V \qquad (4)$$

In the equation (4), a coefficient a represents a real number in the range of 0.75 to 2.0, a unit of D is millimeter, and a unit of V is liter/minute. The range of the coefficient a is a numerical range found as a result of study by the present inventor of the present invention.

In the case where the coefficient a is less than the lower limit value of the above-described range, the plasma gas J and the radical-rich area R reach an excessively deeper position than the melt surface 18b, possibly causing the melt of the silicon 18 to spatter around. This makes it difficult to sufficiently perform the oxidative purification.

On the other hand, in the case where the coefficient a exceeds the upper limit of the above-described range, the plasma gas J and the radical-rich area R do not sufficiently reach the melt surface 18b, which makes it difficult to efficiently perform the oxidative purification.

Further, the distance D represents a distance from the center of the top end of the nozzle port 11c to the melt surface 18b when viewed in the direction of the plasma gas J sprayed from the nozzle port 11c of the plasma torch 10. The distance D does not necessarily indicate a shortest distance from the center of the top end of the nozzle port 11c to the melt surface 18b. In other words, in the case where the plasma gas J is injected at an angle with respect to the melt surface 18b, the distance D is naturally longer than the shortest distance.

By disposing the plasma torch 10 as described above and spraying the plasma gas J to the melt surface 18b, the substantially elliptical recess 18a is formed on the melt surface 18b. In the recess 18a, oxidation reaction mainly occurs, and boron and other impurities are oxidized, and vaporized to be removed.

With the occurrence of vaporization as described above, in some cases, the melt surface 18b gradually lowers during the oxidative purification, and the distance D gradually becomes longer. This causes the radical-rich area R of the plasma gas J to be located above the melt surface 18b, possibly reducing the efficiency in the oxidative purification. In order to suppress the reduction in the efficiency, it is preferable to control the driving unit of the silicon purification device 1 so as to make the distance D constant.

As the method for controlling the distance D, one example is given in which: vaporization speed and the lowering speed of the melt surface 18b are examined in advance through a preliminary experiment; the lowering speed of the plasma torch 10 is set in advance on the basis of the result of the preliminary experiment; and the driving unit is controlling on the basis of the setting at the time of actual oxidative purification. Another method includes: preparing a distance sensor provided at the nozzle port 11c of the plasma torch 10; monitoring the distance D from the nozzle port 11c to the melt surface 18b; controlling the driving unit according to the change in the distance L; and lowering the position of the plasma torch 10.

At the time of controlling the plasma torch 10, the lowering movement of the plasma torch 10 may be performed continuously so as to correspond to the vaporization speed, or may be performed intermittently (in a stepwise manner) within the range in which the radical-rich area R covers the melt surface 18b.

It should be noted that the description has been made of the case where the plasma torch 10 is moved. However, a similar effect can be obtained by moving the crucible 15 upward to keep the distance L constant. In this case, another driving unit for moving the crucible 15 is necessary.

The silicon purification device 1 illustrated in FIG. 5 is an example in which a single plasma torch 10 is provided. However, it is preferable that two or more plasma torches be provided. The reasons for providing the plural plasma torches, the structure of arranging the plural plasma torches, and the method for arranging the plural plasma torches are as described above.

Further, it is desirable that the flow rate of the oxidation gas G2 (steam) to be added fall in the range of 15 volume % to 40 volume % of the total flow rate of the plasma gas (sum total of the flow rate of the plasma working gas G1 and the flow rate of the added oxidation gas G2). This is because, in the case where the flow rate of the oxidation gas G2 is less than 15 volume %, the speed of removing the boron reduces, and in the case where the flow rate of the oxidation gas G2 exceeds 40 volume %, covering with silica is likely to occur, which leads to the reduction in the speed of removing boron.

Further, it is desirable to set a torch output after the addition of the oxidation gas G2 (steam) to be in the range of 3 kW/kg to 30 kW/kg per kg mass of silicon metal to be purified.

Next, the present invention will be described in more detail through Examples. However, the present invention is not limited to these examples.

In Examples 1 to 13 and Comparative Examples 1 to 2, the base materials of silicon metal were purified by using the silicon purification device 1 illustrated in FIG. 5.

Example 1

First, 20 kg of the base material of the silicon metal having boron with a concentration of 10 ppm was placed in a graphite crucible, and was made molten through induction heating. The obtained silicon melt surface had a circular shape with a radius of 300 mm.

Next, a plasma gas was sprayed such that: a temperature of the melt was kept at 1750° C.; the flow rate of the non-transferred type plasma working gas generated by a single plasma torch having an output of 100 kW was set to 100 L/min; the flow rate of the steam to be added was set to 42.9 L/min; and an angle formed by the silicon melt surface and the plasma gas was set at 50°. At this time, the plasma gas was sprayed in the tangential direction of a virtual circle having a radius of 150 mm and having a center same as the center of the melt surface; the position of the plasma torch was adjusted so as to form a substantially elliptical recess having a minor length of about 35 mm on the silicon melt surface; and the distance from a spraying port of the plasma torch to the melt surface was adjusted such that the radical rich area of the plasma gas sufficiently hits the melt surface.

It should be noted that the position of the plasma torch was adjusted such that the intersection point of the minor axis and the major axis of the substantially elliptical recess formed on the melt surface was located on the circumference of the virtual circle.

As the plasma working gas, an Ar gas was employed, and the flow rate of the steam added from the oxidation gas supplying port of the plasma torch was set to 30 volume % of the total flow rate (142.9 L/min) of the plasma gas.

As the molten silicon gradually vaporizes and the melt surface lowers during the purification by spraying the plasma gas, the silicon metal was purified by monitoring the lowering of the melt surface, and lowering the position of the plasma torch according to the lowering of the melt surface so as to appropriately adjust the distance from the plasma torch to the melt surface.

After the start of the purification with the plasma gas, sampling was performed for each 60 minutes, and the purification ends after the sampling of 180 minutes.

The boron concentration in the silicon obtained through the sampling was measured with ICP-MS. The results thereof are shown in Table 1.

TABLE 1

|  | Elapsed time from start of purification (min) | | | |
| --- | --- | --- | --- | --- |
|  | 0 | 60 | 120 | 180 |
| Boron concentration in silicon (ppm) | 10 | 3.0 | 0.9 | 0.3 |

Examples 2 to 8, Comparative Examples 1 to 2

First, 20 kg of the base material of the silicon metal having boron with a concentration of 10 ppm was placed in a graphite crucible, and was made molten through induction heating. The obtained silicon melt surface had a circular shaped with a radius of 300 mm.

Next, plasma gases were sprayed such that: a temperature of the melt was kept at 1750° C.; the flow rate of each of the non-transferred type plasma working gases generated by three plasma torches each having an output of 100 kW was set to 100 L/min; the flow rate of each of the steams to be added was set to 42.9 L/min; and angles formed by the silicon melt surface and the respect plasma gases were set at angles shown in Tables 2 and 3. At this time, the nozzle ports of the plasma torches were arranged at equal intervals on a circle concentric with a virtual circle having a radius of 150 mm and having the same center as the melt surface (similar manner to FIG. 3) in a manner such that the plasma gases were sprayed in the tangential direction of the virtual circle, and three substantially elliptical recesses having a minor length of about 35 mm were formed on a circumference of the virtual circle on the silicon melt surface (similar manner to FIG. 4). Further, the distance from the spraying port of each of the plasma torches to the melt surface was adjusted such that the radical rich area of each of the plasma gases sufficiently hits the melt surface. At this time, each of the plasma gases from the three plasma torches were aligned and sprayed in the forward direction (clockwise direction) with respect to the tangential line of the virtual circle on the silicon melt surface.

It should be noted that, in the substantially elliptical recesses formed on the melt surface, the positions of the plasma torches were adjusted such that the intersection points of the minor axis and the major axis of the recesses are located on the circumference of the virtual circle.

As the plasma working gas, an Ar gas was employed, and the flow rate of the steam added from the oxidation gas supplying port of each of the plasma torches was 30 volume % of the total flow rate (142.9 L/min) of the plasma gas.

As the molten silicon gradually vaporizes and the melt surface lowers during the purification by spraying the plasma gas, the silicon metal was purified by monitoring the lowering of the melt surface, and lowering the position of each of the plasma torches according to the lowering of the melt surface so as to maintain the distance from each of the plasma torches to the melt surface.

As described above, the base materials of the silicon metal were separately purified under conditions in which the formed angles were changed in 10° increments in the range of 10° to 90°. These formed angles are shown in Table 2 and Table 3.

Sampling was performed 60 minutes later after the start of the purification, and the purification ended.

Figure 6:
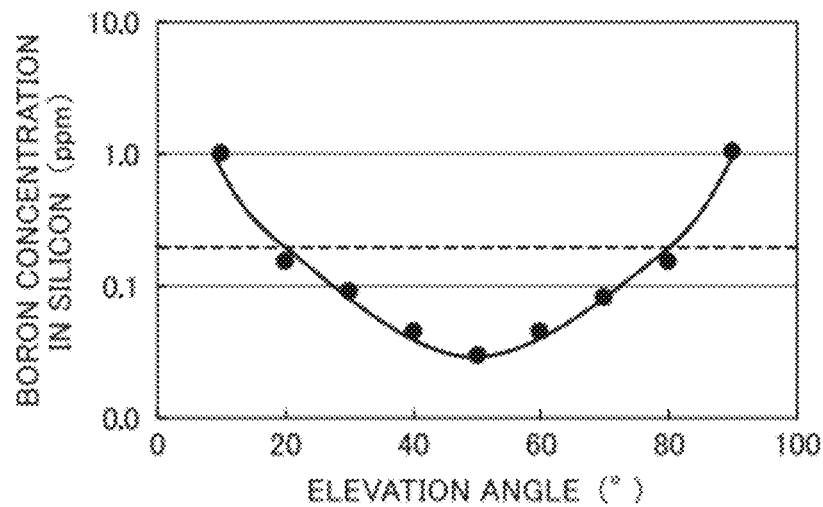
FIG. 6 is a graph illustrating a relationship between an angle formed by the melt surface of the silicon metal and the plasma gas, and a boron concentration in the silicon after the purification.
Figure 7:
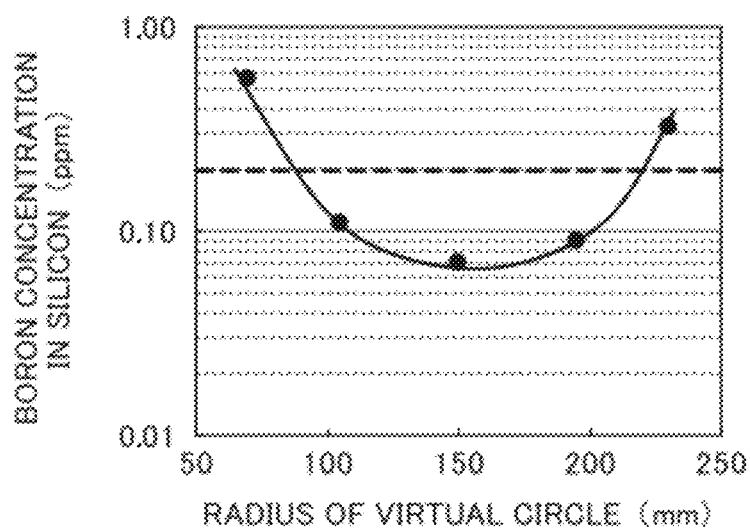
FIG. 7 is a graph illustrating a relationship between a radius of the virtual circle A, and the boron concentration in the silicon after the purification.

The boron concentration in the silicon obtained through the sampling was measured with ICP-MS. The results thereof are shown in Tables 2 and 3, and FIG. 6.

As described above, as the plasma gases from the three plasma torches were aligned and sprayed in the forward direction (clockwise direction) with respect to the tangential line of the virtual circle on the silicon melt surface, a rotation force in the forward direction was applied to the silicon melt, whereby the silicon melt circularly flowed in this forward direction during the purification.

Further, in Comparative Example 1 in which the formed angle was set to 10°, the silicon spattered from the silicon melt due to the spraying of the plasma gas, and after the purification, only about 10 kg of silicon remained (yield of 50%). On the other hand, in Examples 2 to 8 and Comparative Example 2 in which the formed angle was set in the range of 20° to 90°, only little spattering occurred, and about 16 kg to 18 kg of silicon remained after the purification (yield of 80% to 90%).

TABLE 2

|  | Comparative Example 1 | Example 2 | Example 3 | Example 4 | Example 5 |
|---|---|---|---|---|---|
| Formed angle (°) | 10 | 20 | 30 | 40 | 50 |
| Boron concentration in silicon (ppm) | 1.0 | 0.15 | 0.09 | 0.05 | 0.03 |

TABLE 3

|  | Example 6 | Example 7 | Example 8 | Comparative Example 2 |
|---|---|---|---|---|
| Formed angle (°) | 60 | 70 | 80 | 90 |
| Boron concentration in silicon (ppm) | 0.05 | 0.08 | 0.15 | 1.02 |

From the results described above, Examples 2 to 8 according to the present invention confirm that the boron concentration in silicon is 0.3 ppm or lower by setting the formed angle in the range of 20° to 80°, and setting the purification time to 60 minutes.

Further, it is also confirmed that the formed angle is preferable to be set in the range of 30° to 70°, more preferable to be set in the range of 40° to 60°, and much more preferable to be set in the range of 45° to 55° from the viewpoint of enhancing the efficiency in purifying the silicon.

When the results of Example 1 are compared with the results of Example 5, the boron concentrations after the silicon purification with the same formed angle (50°) were 0.3 ppm (Example 1; purification time of 180 minutes), and 0.03 ppm (Example 5; purification time of 60 minutes), respectively. Here, the number of plasma torches of Example 1 is one-third of that of Example 5 but the purification time of Example 1 is three times longer than that of Example 5. Thus, if only the differences in the number of plasma torches and the purification time are considered, the results of the silicon purification with these Examples should be the same. However, in reality, the results differ ten times. This significant difference is considered to be because, in Example 5, in addition to the increase in the number of plasma torches, the respective recesses on the silicon melt surface are prevented from interfering with each other by arranging the nozzle ports of the plasma torches at predetermined positions. Further, the silicon melt can be mixed (convected), whereby the efficiency in purifying the silicon can be further improved.

Examples 9 to 13

First, 20 kg of the base material of the silicon metal having boron with a concentration of 10 ppm was placed in a graphite crucible, and was made molten through induction heating. The obtained silicon melt surface had a circular shape with a radius of 300 mm.

Next, plasma gases were sprayed such that: a temperature of the melt was kept at 1750° C.; the flow rate of each of the non-transferred type plasma working gases generated by three plasma torches each having an output of 100 kW was set to 100 L/min; the flow rate of each of the steams to be added was set to 42.9 L/min; and angles formed by the silicon melt surface and the respect plasma gases were set at an angle of 60°. At this time, the nozzle ports of the plasma torches were arranged at equal intervals on a circle concentric with a virtual circle having a radius shown in Table 4 and having the same center as the melt surface (similar manner to FIG. 3B) in a manner such that the plasma gases were sprayed in the tangential direction of the virtual circle, and three substantially elliptical recesses having a minor length of about 35 mm were formed on a circumference of the virtual circle on the silicon melt surface (similar manner to FIG. 4). Further, the distance from the spraying port of each of the plasma torches to the melt surface was adjusted such that the radical rich area of each of the plasma gases sufficiently hits the melt surface. At this time, each of the plasma gases from the three plasma torches were aligned and sprayed in the forward direction (clockwise direction) with respect to the tangential line of the virtual circle on the silicon melt surface.

It should be noted that the positions of the plasma torches were adjusted such that the intersection point of the minor axis and the major axis of each of the substantial elliptical recesses formed on the melt surface is located on the circumference of the virtual circle.

As the plasma working gas, an Ar gas was employed, and the flow rate of the steam added from the oxidation gas supplying port of each of the plasma torches was 30 volume % of the total flow rate (142.9 L/min) of the plasma gas.

As the molten silicon gradually vaporizes and the melt surface lowers during the purification by spraying the plasma gas, the silicon metal was purified by monitoring the lowering of the melt surface, and lowering the position of each of the plasma torches according to the lowering of the melt surface so as to maintain the distance from the plasma torch to the melt surface.

The base materials of the silicon metal were purified separately by varying the radius of the virtual circle. The radius of each of the virtual circles employed in the purification is shown in Table 4.

Sampling was performed 60 minutes later after the start of the purification, and the purification ended.

The boron concentration in the silicon obtained through the sampling was measured with ICP-MS. The results thereof are shown in Table 4, and FIG. 6.

As described above, as the plasma gases from the three plasma torches were aligned and sprayed in the forward direction (clockwise direction) with respect to the tangential line of the virtual circle on the silicon melt surface, a rotation force in the forward direction was applied to the silicon melt, whereby the silicon melt circularly flowed in this forward direction during the purification. However, in the case where the interference, which will be described later, occurs, the rotation force was not sufficiently applied to the silicon melt, and hence, the silicon melt did not sufficiently circularly flow during the purification.

At the time of the purification under various conditions, the substantially elliptical recesses formed on the silicon melt surface interfered with each other in some cases. In Table 4, the results of the interference are also indicated such that a character "$x_1$" represents that such interference occurred, and a character "○" represents that such interference did not occur.

Further, at the time of the purification under various conditions, the substantially elliptical recess formed on the silicon melt surface was interfered with by a wall surface of the crucible (edge of the melt surface) in some cases. In Table 4, the results of the interference are also indicated such that a character "$x_2$" represents that such interference occurred, and a character "○" represents that such interference did not occur.

TABLE 4

| | Example 9 | Example 10 | Example 11 | Example 12 | Example 13 |
|---|---|---|---|---|---|
| Radius of virtual circle (mm) | 70 | 105 | 150 | 195 | 230 |
| Boron concentration in silicon (ppm) | 0.56 | 0.11 | 0.07 | 0.09 | 0.32 |

TABLE 4-continued

| | Example 9 | Example 10 | Example 11 | Example 12 | Example 13 |
|---|---|---|---|---|---|
| Interference at recess | $x_1$ | ○ | ○ | ○ | $x_2$ |

From the results described above, Examples 9 to 13 according to the present invention confirm that, preferably, the interference does not occur at the recess and the efficiency in purifying the silicon further improves in the case where the purification time is 60 minutes and the radius of the virtual circle is more than or equal to three times the minor length (35 mm×3=105 mm) and is less than or equal to a value obtained by subtracting three times the minor length from the radius of the circular silicon melt surface (300 mm−105 mm=195 mm).

From the results described above, it is obvious that the silicon purification method according to the present invention improves the efficiency in purifying the silicon as compared with the conventional method.

Second Embodiment

Next, a second embodiment according to the present invention will be described.

Figure 8:
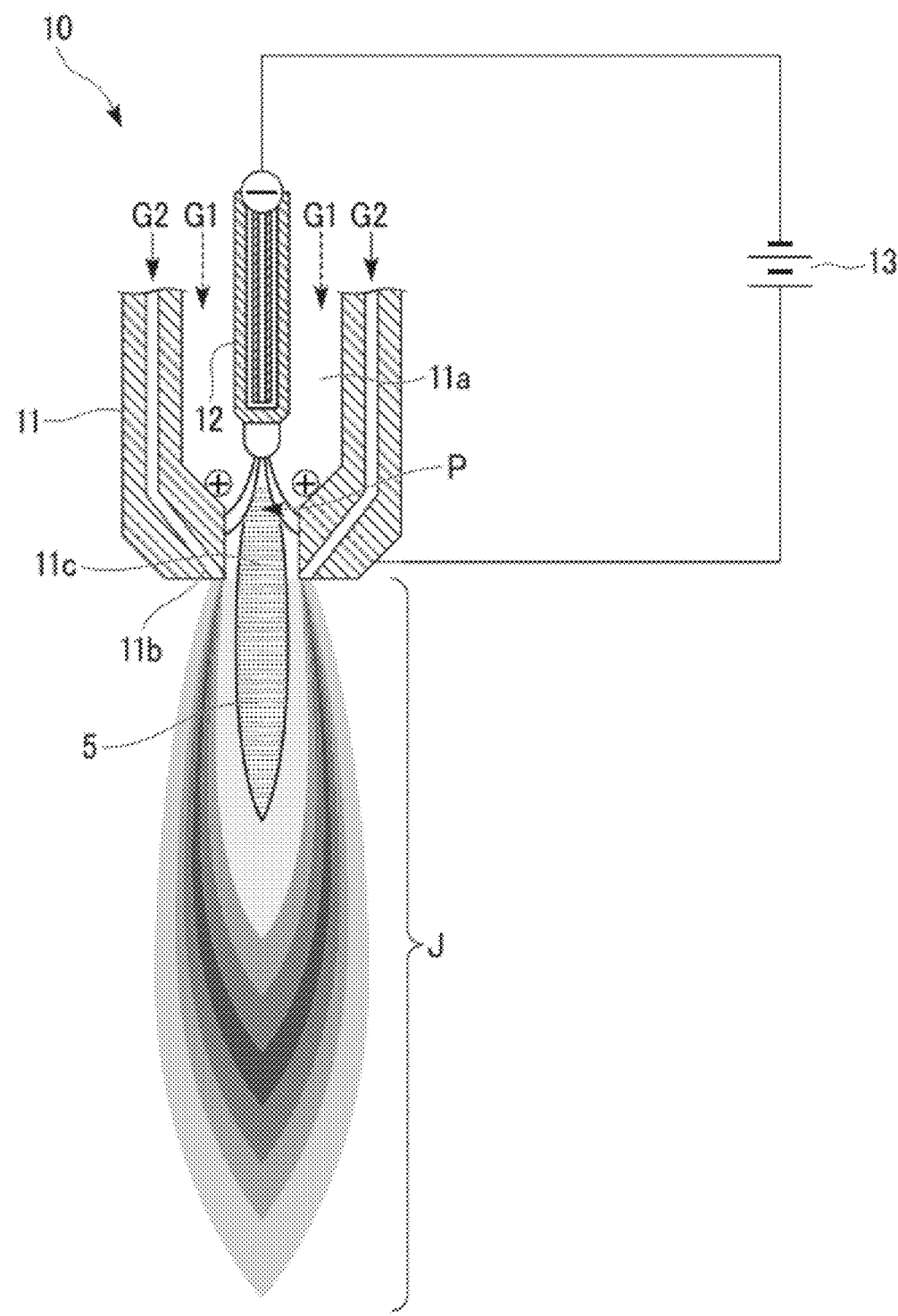
FIG. 8 is a schematic sectional view illustrating a configuration example of the plasma torch of the silicon purification device according to the present invention, and the plasma gas injected from this plasma torch.

FIG. 8 is a schematic sectional view illustrating a configuration example of the plasma torch 10 of the silicon purification device 1 applicable to the silicon purification method according to the present invention, and the plasma gas J injected from the plasma torch 10.

The plasma torch 10 includes the anode electrode 11, the cathode electrode 12, the plasma-working-gas supplying port 11a, and the steam supplying port 11b.

In a space surrounded by the anode electrode 11, the plasma-working-gas supplying port (supplying path) 11a for supplying the plasma working gas (inert gas) G1 to the nozzle port 11c of the plasma torch 10 is formed. As the plasma working gas G1, the argon (Ar) gas is used in this embodiment. Further, although not illustrated in the drawing, the cooling unit for preventing the anode electrode 11 from overheating may be provided in the vicinity of the anode electrode 11 (position near the anode electrode 11) or within the anode electrode 11.

Further, as the plasma working gas G1, it may be possible to employ an inert gas such as an argon (Ar) gas, or a mixture gas in which a hydrogen ($H_2$) gas is mixed with the argon gas, or the like. By mixing the hydrogen gas with the argon gas, it is possible to improve the efficiency in removal through the oxidation of the impurities in the silicon metal.

The cathode electrode 12 is provided in the space surrounded by the anode electrode 11. The cathode electrode 12 is insulated from the anode electrode 11, is electrically connected with the negative pole of the direct-current power supply 13, and radiates thermo electrons for generating a plasma arc P with the anode electrode 11.

By supplying the argon gas serving as the plasma working gas G1 from the plasma-working-gas supplying port 11a to the nozzle port 11c while generating the plasma arc P, the plasma flame 5 containing the plasma gas is injected from the nozzle port 11c.

The anode electrode 11 includes the plasma-working-gas supplying port 11a, and the steam supplying port 11b provided at a position different from the plasma-working-gas supplying port 11a and supplying a steam G2 to the vicinity of the nozzle port 11c of the plasma torch 10 (near the nozzle port 11c). By adding the steam to the plasma gas by a predetermined volume %, the plasma gas J containing the large amount of radical such as OH radical together with the plasma flame 5 are injected from the nozzle port 11c.

The expression "adding the steam G2 by a predetermined volume %" as used herein means a ratio of the steam G2 with respect to the sum total (plasma gas) of the volume of the plasma working gas G1 and the volume of the steam G2. For example, in the case where the steam G2 with the flow rate of 20 L/min is added to the plasma working gas G1 with the flow rate of 80 L/min, the total flow rate of the plasma gas is 100 L/min. In this case, the steam G2 is added by 20 volume %.

By adding the steam G2 to the plasma gas J at a ratio in the range of 15 volume % to 40 volume % of the total flow rate of the plasma gas J (sum total of the flow rate of the plasma working gas G1 and the flow rate of the added steam G2), it is possible to make the plasma gas J contain the large amount of radical such as OH radical, and oxidize the impurities at the surface of the recess 18a to sufficiently remove the impurities.

It is preferable that the ratio of the steam G2 to be added in the silicon purification method according to the present invention be set in the range of 15 volume % to 40 volume % of the total flow rate of the plasma gas J, more preferably set in the range of 20 volume % to 40 volume %, and the most preferably set in the range of 25 volume % to 35 volume %.

By setting the ratio to the lower limit value or more in the above-described range, it is possible to make the plasma gas J contain the sufficient amount of radical. Further, by setting the ratio to the upper limit value or less in the above-described range, it is possible to suppress the contamination of the silicon melt caused by the fact that silicon vaporizing from the silicon melt surface becomes powder of $SiO_2$, the powder of $SiO_2$ adheres to a furnace body (inside of the device including the vicinity of the plasma torch and the crucible), and the adhered powder of $SiO_2$ falls into the silicon melt.

In the case where the ratio of addition of the steam G2 is set in the range of 15 volume % to 40 volume % of the total flow rate of the plasma gas J and the melt temperature of the silicon is less than 1700° C., a coating made of silicon oxide ($SiO_2$) is likely to be formed on the silicon melt surface, which causes a tendency of reducing the efficiency in purifying the silicon. Further, in the case where the melt temperature exceeds 1900° C., silicon vaporizing from the silicon melt surface becomes $SiO_2$, the $SiO_2$ adheres to the furnace body (inside of the device including the vicinity of the plasma torch and the vicinity of the crucible), and the adhered $SiO_2$ falls into the silicon melt, possibly contaminating the silicon metal.

As the method for supplying the steam G2, it is preferable to add the steam from the vicinity of the nozzle port 11c of the anode electrode 11, in other words, from the steam supplying port 11b provided near the nozzle port 11c as illustrated in FIG. 8. By adding the steam through the method described above, it is possible to efficiently form a radical rich area R, which will be described later, in the plasma gas.

As another method, it may be possible to employ a method in which a nozzle of a steam supplying device, which is provided separately from the plasma torch 10, is disposed so as to be targeted at the plasma gas to add the steam in the plasma gas.

The concentration distribution of the OH radical (radical derived from the steam) in the plasma gas J is illustrated in FIG. 8 as stepwise gradation for the purpose of convenience. However, it is considered that, in reality, the concentration distribution gradually changes. More specifically, the concentration distribution of the OH radical can be expressed as a normal distribution having a peak at a center of the area R illustrated in FIG. 8, when viewed in the direction from the top end of the plasma flame 5 toward the top end of the plasma gas J. Thus, the area denoted by R in FIG. 8 is an area having the largest amount of radical in the radical-rich plasma gas J. This area R is referred to as the radical rich area R in this specification.

It should be noted that the concentration distribution of the radical in the plasma gas J can be examined through an optical measurement method employing, for example, a high-speed gate camera having an image intensifier and CCD elements.

Figure 9:
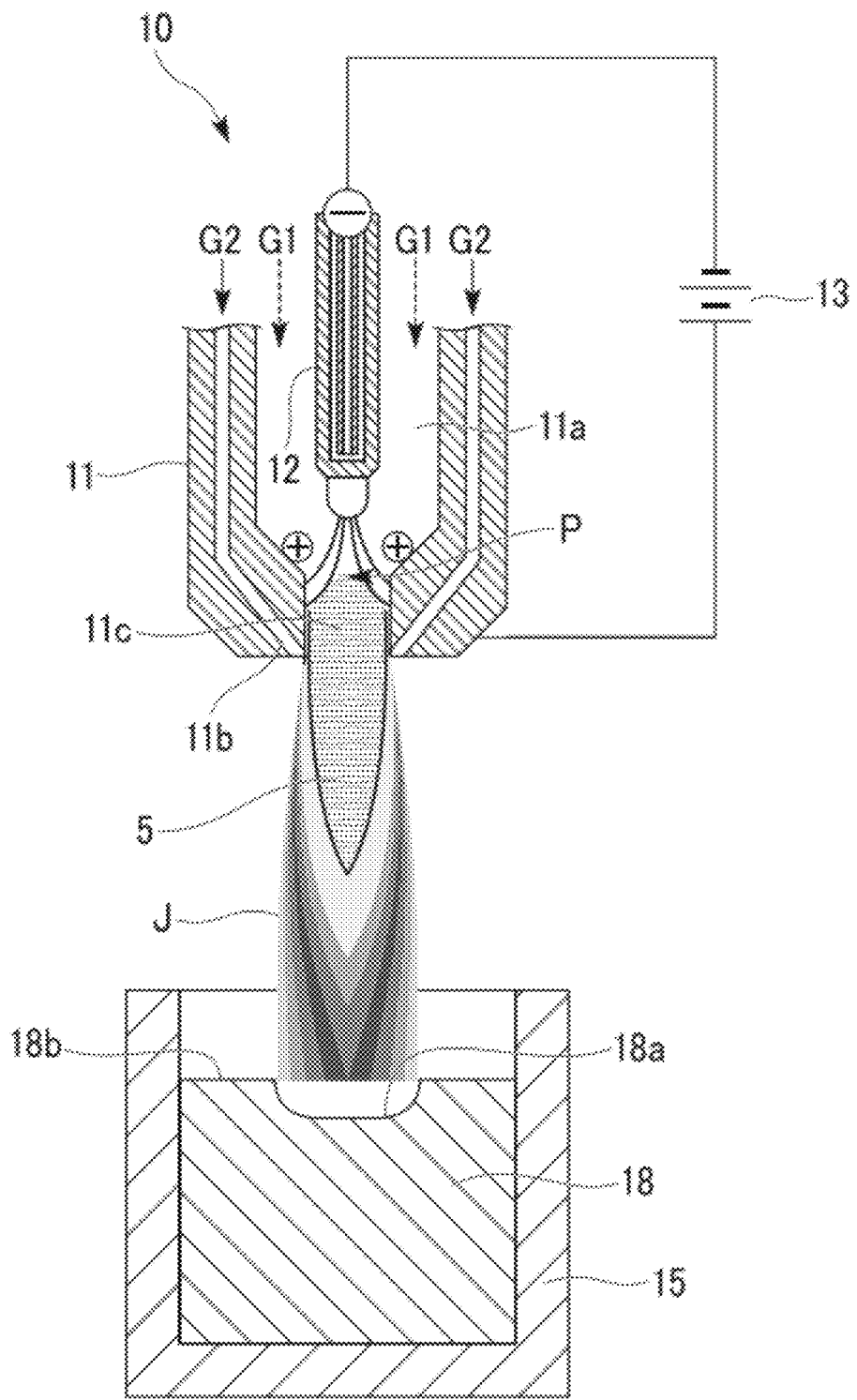
FIG. 9 is schematic sectional view illustrating a relationship of relative positions between a nozzle port of the plasma torch and the melt surface of the silicon metal in the silicon purification device according to the present invention.

FIG. 9 is schematic sectional view illustrating a relationship of relative positions between the nozzle port 11c of the plasma torch 10 and the melt surface 18b of the silicon metal 18 in the silicon purification device 1 applicable to the silicon purification method according to the present invention.

The nozzle port 11c is targeted at the crucible 15 so as to spray the plasma gas J injected from the nozzle port 11c and containing the radical onto the melt surface 18b of the silicon melt 18 in the melt state. On the melt surface 18b on which the plasma gas J is sprayed, the recess 18a is formed.

At the time when the plasma gas J is sprayed on the melt surface 18b, it is desirable to adjust the distance between the plasma torch 10 and the melt surface 18b as appropriate so as to position the radical rich area R of the plasma gas J at the melt surface 18b. By forming the recess 18a with the radical rich area R, the radical (OH radical and the like) contained in the plasma gas J can be further efficiently brought into contact with the melt surface 18b, whereby it is possible to further improve the efficiency in purifying the silicon through the oxidation reaction of the impurities in the silicon metal 18.

As a mechanism of removing boron which is an impurity in the silicon metal 18, it is considered that, on the surface of the recess 18a formed on the melt surface 18b with the plasma gas J having the steam G2 added therein, boron is oxidized with at least the oxidation gas G2 and radical from the oxidation gas G2 (for example, OH radical), and then, the oxidized boron is vaporized and removed.

Further, by employing, as the plasma working gas G1, a mixture gas having hydrogen gas mixed with the Ar gas, it is also possible to enhance the oxidization and removal of the impurities on the surface of the recess 18a. In the case of employing this mixture gas, the purification efficiency can be further improved by adding the steam G2.

The crucible 15 is disposed directly below the plasma torch 10, and contains the silicon metal 18. The silicon metal 18 may be heated with the plasma gas J into a melt state, or may be molten with another method (for example, high frequency induction heating employing an induction coil).

As the base material of the silicon metal 18, it is preferable to employ a silicon base material used for photoelectric conversion elements of solar cell. In general, the silicon base material contains boron of about 10 ppm as an impurity, and it is desirable to purify the silicon metal such that the boron concentration is not more than 0.3 ppm.

It is preferable that the material of the crucible 15 contain graphite as a main component. There is no specific limitation on components in the material other than graphite, as long as the component in the material does not melt even if the material is heated to 1700° C. or more.

The amount of graphite in the material of the crucible 15 is preferably more than or equal to 60 mass %, more preferably more than or equal to 80%, much more preferably more than or equal to 95%, and may be 100%.

In the silicon purification method according to the present invention, by employing the crucible 15 made of a material containing graphite as a main component, it is possible to control the melt temperature of the silicon melt to be 1700° C. or more to easily purify the silicon melt. As described above, by maintaining the silicon melt temperature higher than the conventional technique to purify the silicon, it is possible to further enhance the oxidization and removal of the impurity on the surface of the recess 18a as compared with the conventional technique. Further, by maintaining the silicon melt temperature higher than that of the conventional technique to purify the silicon metal, the amount of steam G2 added to the plasma gas J can be increased as compared with the conventional technique, whereby it is possible to further enhance the oxidation and removal of the impurities on the surface of the recess 18a.

It should be noted that the melt temperature of the silicon metal refers to a temperature of the surface of the melt (melt surface 18b) as well as a temperature of the melt in the vicinity of the surface of the melt (area close to the surface of the melt).

From the viewpoint of improving the efficiency in purifying the silicon, the temperature of the silicon metal melt is preferably in the range of the 1750° C. to 1900° C. in the range of 1700° C. to 1900° C., more preferably in the range of 1750° C. to 1850° C., much more preferably in the range of 1750° C. to 1800° C.

By setting the temperature to the lower limit value or more in the above-described range, it is possible to sufficiently suppress the formation of the coating of $SiO_2$ on the silicon melt surface. Further, by setting the temperature to the upper limit value or less in the above-described range, it is possible to reduce the amount of silicon vaporizing from the silicon melt, whereby it is possible to reduce the silicon changing into the powder of $SiO_2$ and suppress the adhesion of the powder to the furnace body of the device.

On the other hand, in the case of employing the crucible made of a material mainly formed by quartz as is the case with the conventional technique, it is difficult to adjust the melt temperature at 1700° C. or more at the time of purifying the silicon metal, since the melting point of the quartz is about 1650° C. This is because quartz is eluted from the crucible, $SiO_2$ is mixed with the silicon metal, and the coating of $SiO_2$ is formed on the silicon melt, deteriorating the efficiency of the purification.

Further, in the case where, at the silicon melt temperature employed in the conventional technique (less than 1650° C.), the concentration of steam added to the plasma gas J is made larger than (for example, by 30 volume %) that in the conventional technique as described above, the coating of $SiO_2$ is formed on the silicon melt surface, or the powder of $SiO_2$ adheres to the furnace body and falls into the silicon melt to be molten again, so that the efficiency in purifying the silicon and/or the degree of purification of the silicon tends to deteriorate.

Figure 10:
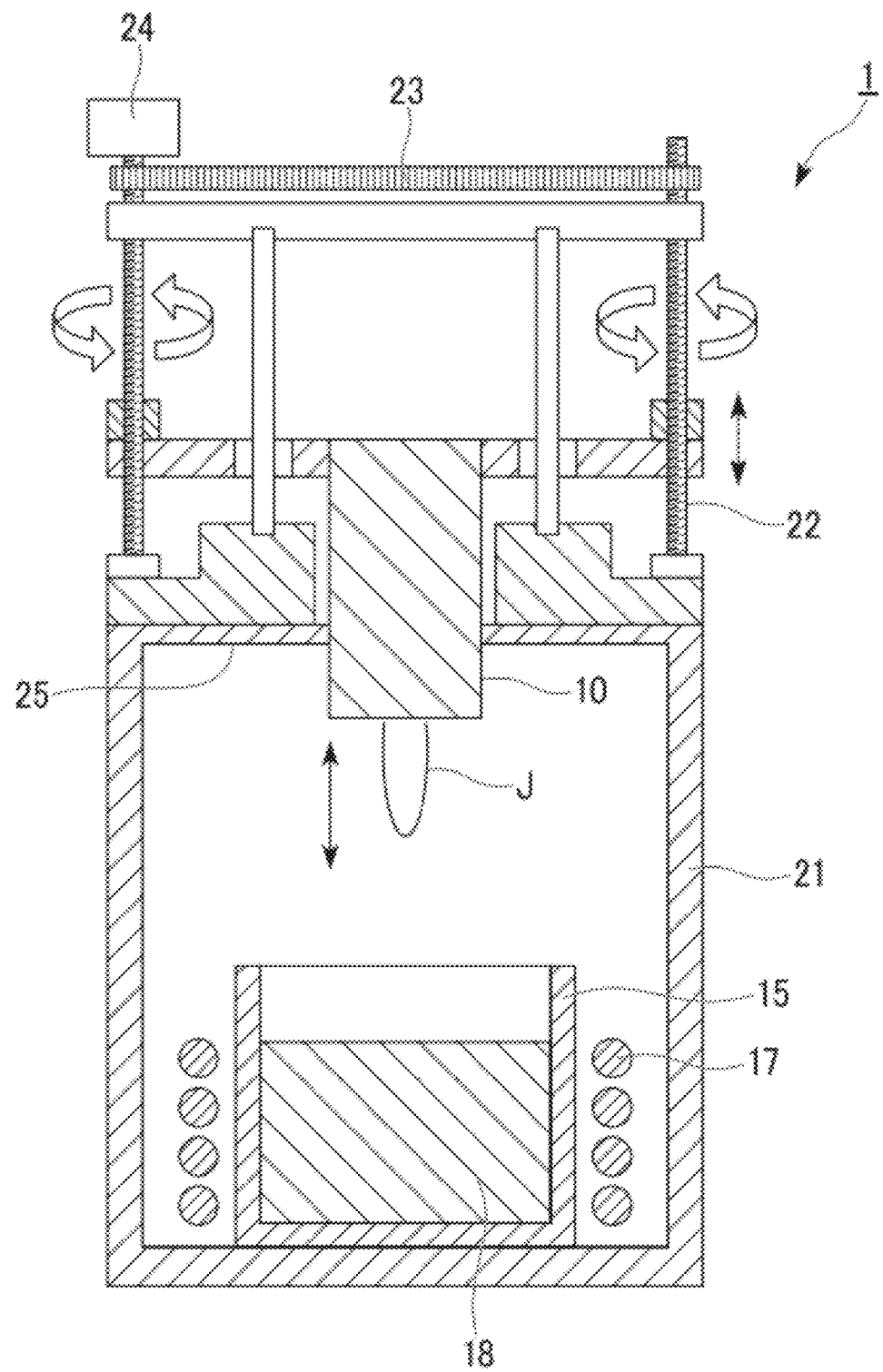
FIG. 10 is a schematic sectional view for explaining a configuration example of the silicon purification device according to the present invention, and operations thereof.

FIG. 10 is a schematic sectional view illustrating a configuration example of the silicon purification device 1 applicable to the silicon purification method according to the present invention, and operations of the silicon purification device 1. The plasma torch 10 is disposed vertically above the crucible 15 having the induction coil 17 wound therearound, and is connected to the driving unit for moving upward and downward the plasma torch 10 in a vertical direction. The driving unit is placed on a base 21.

The driving unit in FIG. 10 includes the ball screw 22, the belt 23, and the motor 24. A driving force from the motor 24 rotates the ball screw 22 through the belt 23, and the shaft connected to the ball screw is moved upward and downward in the vertical direction. As the plasma torch 10 is connected to the shaft, by controlling the rotation of the motor 24, it is possible to bring the plasma torch 10 close to and away from the silicon metal 18 loaded in the crucible 15. In other words, by controlling the driving unit, it is possible to adjust the distance D from the center of the top end of the nozzle port 11c of the plasma torch 10 to the melt surface 18b of the silicon metal 18 to a predetermined distance.

It is preferable that the silicon purification device 1 according to the present invention and having the driving unit as described above operate and control so as to keep the distance D constant during the purification of the silicon. Methods of this operation together with a procedure of purifying the silicon using the silicon purification device 1 will be described.

First, the silicon metal (base material made of the silicon metal) 18 is loaded in the crucible 15. Then, the silicon metal 18 is molten through a high frequency induction heating with the induction coil 17. The melting is determined to be complete when the silicon metal 18 reaches 1420° C. or more and no block-like silicon can be seen.

The temperature of the melt of the silicon at the time of purifying the silicon is set in the range of 1700° C. to 1900° C.

Next, by controlling the driving unit, the plasma torch 10 is brought close to the melt surface 18b in the melt state; the plasma torch 10 is positioned at a predetermined position; the plasma working gas G1 (Ar gas) is supplied; the steam G2 is added; and the plasma gas J is sprayed from the nozzle port 11c of the plasma torch 10 to the melt surface 18b.

At this time, the steam G2 is added from the steam supplying port 11b at a ratio in the range of 15 volume % to 40 volume % with respect to the total flow rate of the plasma gas J.

At this time, by positioning the plasma torch 10 at a predetermined position so as to locate the radical rich area R of the plasma gas J at the melt surface 18b, the purification efficiency can be further improved. As the method for this, it is preferable that the plasma torch 10 be disposed so as to satisfy the following equation (5) between the distance D from the center of the top end of the nozzle port 11c of the plasma torch 10 to the melt surface 18b, and the flow rate V of the plasma working gas G1.

[Equation 5]

$$D = a \times V \qquad (5)$$

In the equation (5), a coefficient a represents a real number in the range of 0.75 to 2.0, a unit of D is millimeter, and a unit of V is liter/minute. The range of the coefficient a is a numerical range found as a result of study by the present inventor of the present invention.

In the case where the coefficient a is less than the lower limit value of the above-described range, the plasma gas J and the radical rich area R reach an excessively deeper position than the melt surface 18b, possibly causing the melt of the silicon 18 to spatter around. This makes it difficult to sufficiently perform the oxidative purification.

On the other hand, in the case where the coefficient a exceeds the upper limit of the above-described range, the plasma gas J and the radical rich area R do not sufficiently reach the melt surface 18b, which makes it difficult to efficiently perform the oxidative purification.

Further, the distance D represents a distance from the center of the top end of the nozzle port 11c to the melt surface 18b when viewed in the direction of the plasma gas J sprayed from the nozzle port 11c of the plasma torch 10. The distance D does not necessarily indicate a shortest distance from the center of the top end of the nozzle port 11c to the melt surface 18b. In other words, in the case where the plasma gas J is injected at an angle with respect to the melt surface 18b, the distance D is naturally longer than the shortest distance.

By disposing the plasma torch 10 and spraying the plasma gas J to the melt surface 18b as described above, the recess 18a is formed on the melt surface 18b. In the recess 18a, oxidation reaction mainly occurs, and boron and other impurities are oxidized, and vaporized to be removed.

With the occurrence of vaporization as described above, in some cases, the melt surface 18b gradually lowers during the oxidative purification, and the distance D gradually becomes longer. This causes the radical rich area R of the plasma gas J to be located above the melt surface 18b, possibly reducing the efficiency in the oxidative purification. In order to suppress the reduction in the efficiency, it is preferable to control the driving unit of the silicon purification device 1 so as to make the distance D constant.

As the method for controlling the distance D, one example is given in which: vaporization speed and the lowering speed of the melt surface 18b are examined in advance through a preliminary experiment; the lowering speed of the plasma torch 10 is set in advance on the basis of the result of the preliminary experiment; and the driving unit controls on the basis of the setting at the time of actual oxidative purification. Another method includes: preparing a distance sensor provided at the nozzle port 11c of the plasma torch 10; monitoring the distance D from the nozzle port 11c to the melt surface 18b; controlling the driving unit according to the change in the distance L; and lowering the position of the plasma torch 10.

At the time of controlling the plasma torch 10, the lowering movement of the plasma torch 10 may be performed continuously so as to correspond to the vaporization speed, or may be performed intermittently (in a stepwise manner) within the range in which the radical rich area R covers the melt surface 18b.

It should be noted that the description has been made of the case where the plasma torch 10 is moved. However, a similar effect can be obtained by moving the crucible 15 upward to keep the distance L constant. In this case, another driving unit for moving the crucible 15 is necessary.

Further, it is desirable to set a torch output after the addition of the steam G2 to be in the range of 3 kW/kg to 30 kW/kg per kg mass of silicon metal to be purified.

The silicon purification device 1 illustrated in FIG. 10 is a case in which a single plasma torch 10 is provided. However, it may be possible to provide two or more plasma torches. By purifying the silicon metal using the plural plasma torches, it is possible to further increase the purification speed as compared with the case in which only one plasma torch is used.

Next, the present invention will be described in more detail using Examples. However, the present invention is not limited to these Examples.

In Examples 14 to 17, and Comparative Example 3, the base materials of the silicon metal were purified using the silicon purification device 1 illustrated in FIG. 10.

Example 14

First, 5 kg of the base material of the silicon metal having boron with a concentration of 10 ppm was placed in a graphite crucible (having the amount of graphite of 99%), and was made molten through induction heating.

Next, a plasma gas was sprayed such that: a temperature of the melt was kept at 1750° C.; the flow rate of the non-transferred type plasma working gas generated by a plasma torch having an output of 100 kW was set to 100 L/min; the flow rate of the steam to be added was set to 33.3 L/min; and the radical rich area of the plasma gas was positioned at a height of the melt surface. An Ar gas was employed as the plasma working gas. The flow rate of the steam added from the oxidation gas supplying port of the plasma torch was set to be 25 volume % of the total flow rate of the plasma gas (133.33 L/min).

As the molten silicon gradually vaporizes and the melt surface lowers during the purification by spraying the plasma gas, the silicon metal was purified by monitoring the lowering of the melt surface, and lowering the position of the plasma torch according to the lowering of the melt surface so as to appropriately adjust the distance from the plasma torch to the melt surface.

After the start of the purification with the plasma gas, sampling was performed for each 20 minutes, and the purification ends after the sampling of 60 minutes.

The boron concentration in the silicon obtained through the sampling was measured with ICP-MS. Table 5 shows the results. Note that, in Table 5, the degree of removal of the boron was evaluated according to the following criteria.

[Evaluation criteria of the degree of boron removal] x: the boron concentration in the silicon was 2.0 ppm or more. Δ: the boron concentration in the silicon is more than 0.3 ppm and less than 2.0 ppm. ○: the boron concentration in the silicon is more than 0.1 ppm and less than 0.3 ppm. ○○: the boron concentration in the silicon is 0.1 ppm or lower.

TABLE 5

|  | Elapsed time from start of purification (min) | | | |
| --- | --- | --- | --- | --- |
|  | 0 | 20 | 40 | 60 |
| Boron concentration in silicon (ppm) | 10.0 | 1.80 | 0.27 | 0.05 |
| Degree of boron removal | x | Δ | ○ | ○○ |

From the results described above, it is confirmed that, with Example 14 according to the present invention, the boron concentration in the silicon is less than or equal to 0.3 ppm by setting the purification time to 40 minutes or more.

Examples 15 to 19, Comparative Examples 3 to 4

The silicon was purified under the same conditions of Example 14 except that the amount of steam added to the plasma gas in Example 14 was changed to 10, 15, 20, 25, 30, 40, and 45 volume %.

Sampling was performed 60 minutes later after the start of the purification with the plasma gas, and the purification ended.

Figure 11:
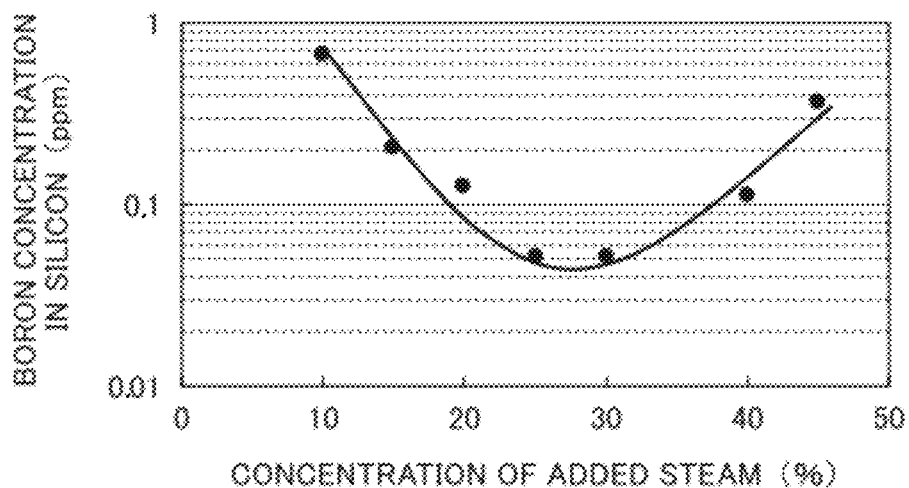
FIG. 11 is a graph showing a relationship between the concentration (volume %) of the steam added in the plasma gas and the boron concentration in the silicon.

The boron concentration in the silicon obtained through the sampling was measured with ICP-MS. Table 6 and FIG. 11 show the results. Note that, in Table 6, the degree of removal of the boron was evaluated according to the above-described criteria.

TABLE 6

| | Comparative Example 3 | Example 15 | Example 16 | Example 17 | Example 18 | Example 19 | Comparative Example 4 |
|---|---|---|---|---|---|---|---|
| The amount of added steam (volume %) | 10 | 15 | 20 | 25 | 30 | 40 | 45 |
| Boron concentration in silicon (ppm) | 0.67 | 0.20 | 0.13 | 0.05 | 0.05 | 0.11 | 0.37 |
| Degree of boron removal | Δ | ○ | ○ | ○○ | ○○ | ○ | Δ |

From the results described above, Examples 15 to 19 according to the present invention confirm that the boron concentration in the silicon is less than or equal to 0.3 ppm by setting the amount of added steam in the range of 15 volume % to 40 volume % of the total flow rate of the plasma gas under the conditions of the purification time of 60 minutes for each steam amount.

On the other hand, Comparative Example 3 confirms that the purification efficiency deteriorates if the amount of added steam is small. Further, with Comparative Example 4, the amount of added steam is large and the powder containing $SiO_2$ is generated. Thus, in some cases, the powder adheres to the furnace body (in the vicinity of the crucible, and the plasma torch), and enters the silicon melt as contaminants.

Example 20

Silicon purification was performed under the same conditions as Example 14 except that an Ar gas with a flow rate of 100 L/min and a hydrogen gas with a flow rate of 100 L/min were supplied to form a mixture gas with a flow rate of 200 L/min as the plasma working gas of the plasma gas in Example 14.

It should be noted that the flow rate of the steam added from the oxidation gas supplying port of the plasma torch is set to be 66.6 L/min, which is 25 volume % of the total flow rate of the plasma gas (sum total of the flow rates of the Ar gas, the hydrogen gas, and the steam).

Sampling was performed for each 20 minutes after the start of the purification with the plasma gas, and the purification ends after the sampling of 60 minutes.

The boron concentration in the silicon obtained through the sampling was measured with ICP-MS. Table 7 shows the results. Note that, in Table 7, the degree of removal of the boron was evaluated according to the above-described criteria.

TABLE 7

| | Elapsed time from start of purification (min) | | | |
|---|---|---|---|---|
| | 0 | 20 | 40 | 60 |
| Boron concentration in silicon (ppm) | 10.0 | 0.31 | 0.03 | 0.03 |
| Degree of boron removal | x | Δ | ○○ | ○○ |

From the results described above, Example 20 according to the present invention confirms that the boron concentration in the silicon is less than or equal to 0.3 ppm by setting the purification time to 40 minutes or more.

Examples 21 to 25, Comparative Examples 5 to 6

Silicon purification was performed under the same conditions as Example 14 except that the melt temperature in Example 1 is changed into the temperatures in the range of 1650° C. to 1950° C. as shown in Table 8.

Sampling was performed 60 minutes later after the start of the purification, and the purification ended.

Figure 12:
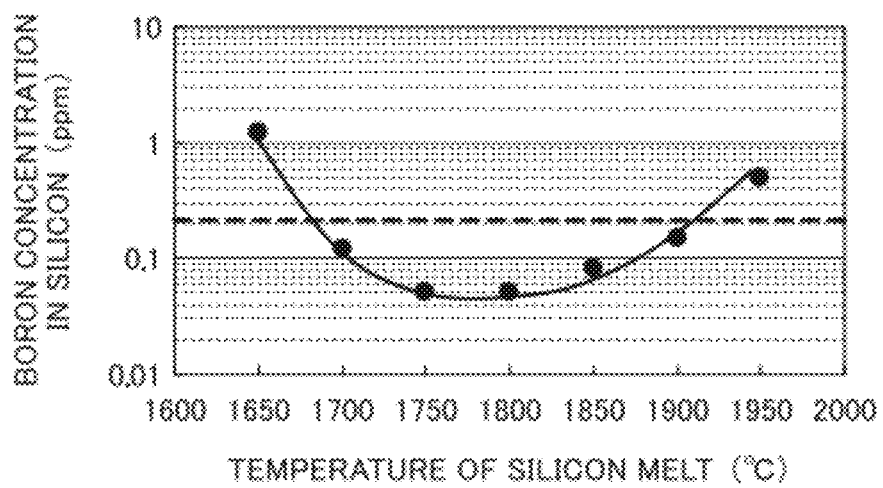
FIG. 12 is a graph showing a relationship between temperatures of the silicon melt during the silicon purification and the boron concentration in the silicon.

The boron concentration in the silicon obtained through the sampling was measured with ICP-MS. Table 8 and FIG. 12 show the results. Note that, in Table 8, the degree of removal of the boron was evaluated according to the above-described criteria.

TABLE 8

| | Comparative Example 5 | Example 21 | Example 22 | Example 23 | Example 24 | Example 25 | Comparative Example 6 |
|---|---|---|---|---|---|---|---|
| Silicon melt temperature (° C.) | 1650 | 1700 | 1750 | 1800 | 1850 | 1900 | 1950 |
| Boron concentration in silicon (ppm) | 1.22 | 0.12 | 0.05 | 0.05 | 0.08 | 0.15 | 0.50 |
| Degree of boron removal | Δ | ○ | ○○ | ○○ | ○○ | ○ | Δ |

From the results described above, Examples 21 to 25 according to the present invention confirm that the boron concentration in the silicon is less than or equal to 0.3 ppm by setting the silicon melt temperature in the range of 1700° C. to 1900° C. under the conditions of the purification time of 60 minutes for each silicon melt temperature.

On the other hand, it is confirmed that, in the case where the silicon melt temperature is set to 1650° C., the silicon melt temperature is lower. Thus, the coating containing SiO$_2$ is likely to be formed on the silicon melt surface, deteriorating the purification efficiency. Further, in the case where the silicon melt temperature is set to 1950° C., the silicon melt temperature is undesirably high. Thus, in some cases, the powder containing SiO$_2$ is generated, adheres to the furnace body (in the vicinity of the crucible, and the plasma torch), and enters the silicon melt as the contaminants.

Comparative Example 7

Silicon purification was performed under the same condition as Example 14 except that the crucible made of graphite used in Example 14 is changed into the crucible made of quartz.

Sampling was performed for each 20 minutes after the start of the purification with the plasma gas, and the purification ends after the sampling of 60 minutes.

The boron concentration in the silicon obtained through the sampling was measured with ICP-MS. Table 9 shows the results.

TABLE 9

|  | Elapsed time from start of purification (min) | | | |
| --- | --- | --- | --- | --- |
|  | 0 | 20 | 40 | 60 |
| Boron concentration in silicon (ppm) | 10.0 | 7.9 | 6.6 | 5.3 |
| Degree of boron removal | x | x | x | x |

It is confirmed that, with Comparative Example 7, the brightness of the silicon melt surface is high as compared with that in Example 14 according to the present invention.

From the results described above, Comparative Example 5 confirms that, as the silicon melt temperature in Comparative Example 5 is higher than the melting temperature of quartz (about 1650° C.), SiO$_2$ is eluted from the quartz crucible, and the coating containing SiO$_2$ is likely to be formed on the silicon melt surface, deteriorating the purification efficiency.

From the results described above, it is obvious that the silicon purification method according to the present invention improves the efficiency in purifying the silicon as compared with the conventional method.

Third Embodiment

Next, a third embodiment according to the present invention will be described.

Figure 13:
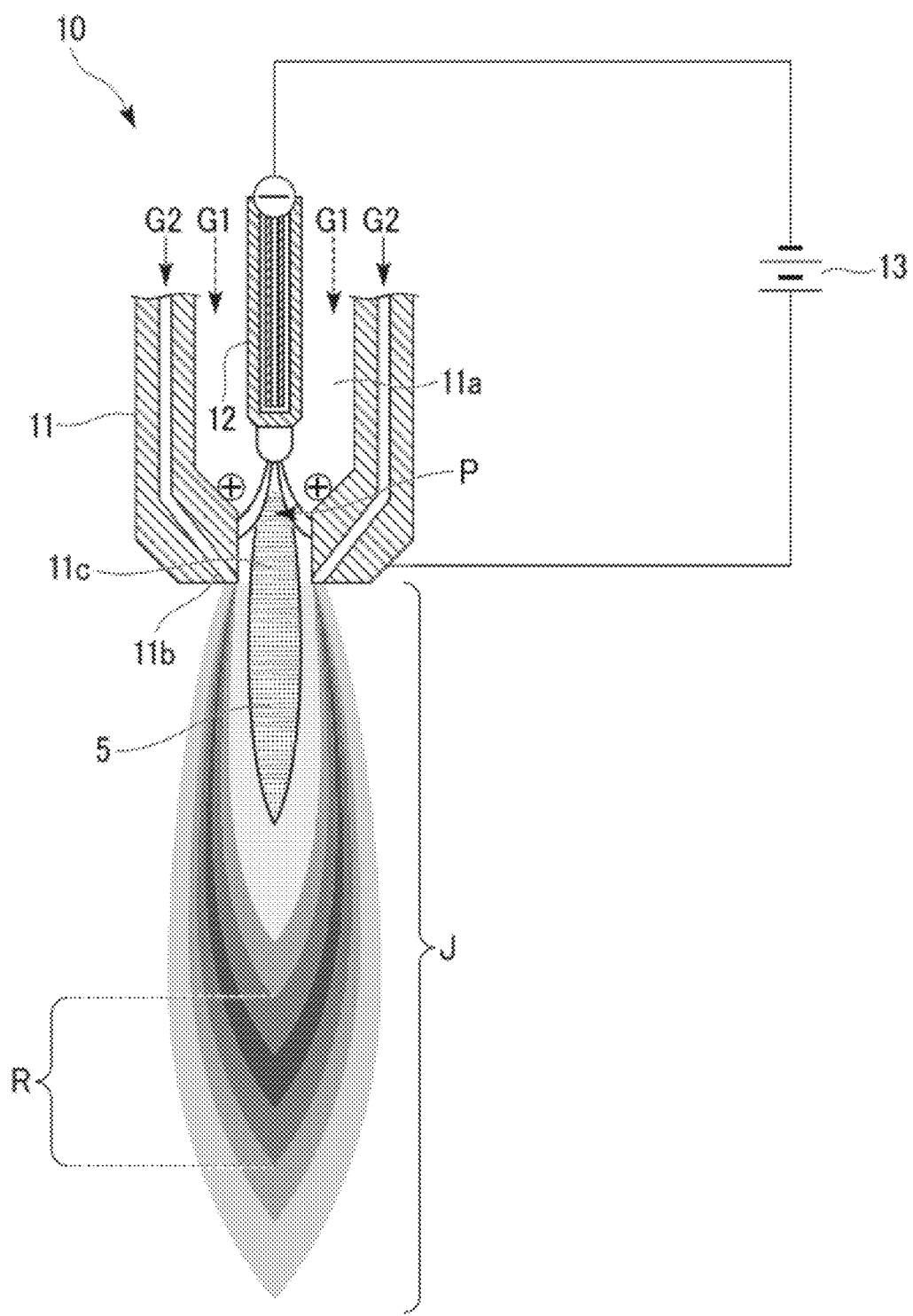
FIG. 13 is a schematic sectional view for explaining a configuration example of the plasma torch of the silicon purification device according to the present invention, and the plasma gas injected from this plasma torch.

FIG. 13 is a schematic sectional view for explaining a configuration example of the plasma torch 10 of the silicon purification device 1 applicable to the silicon purification method according to the present invention, and the plasma gas J injected from the plasma torch 10.

The plasma torch 10 includes the anode electrode 11, the cathode electrode 12, the plasma-working-gas supplying port 11a, and the oxidation-gas supplying port 11b.

In a space surrounded by the anode electrode 11, the plasma-working-gas supplying port (supplying path) 11a for supplying the plasma working gas (inert gas) G1 to the nozzle port 11c of the plasma torch 10 is formed. As the plasma working gas G1, the argon (Ar) gas is used in this embodiment. Further, although not illustrated in the drawing, the cooling unit for preventing the anode electrode 11 from overheating may be provided in the vicinity of the anode electrode 11 (position near the anode electrode 11) or within the anode electrode 11.

Further, as the plasma working gas G1, it may be possible to employ an inert gas such as an argon (Ar) gas, or a mixture gas in which a hydrogen (H$_2$) gas is mixed with the argon gas, or the like. By mixing the hydrogen gas with the argon gas, it is possible to improve the efficiency in removing due to the oxidation of the impurities in the silicon metal.

The cathode electrode 12 is provided in the space surrounded by the anode electrode 11. The cathode electrode 12 is insulated from the anode electrode 11, is electrically connected with the negative pole of the direct-current power supply 13, and radiates thermo electrons for generating a plasma arc P with the anode electrode 11.

By supplying the argon gas serving as the plasma working gas G1 from the plasma-working-gas supplying port 11a to the nozzle port 11c while generating the plasma arc P, the plasma flame 5 containing the plasma gas is injected from the nozzle port 11c.

The anode electrode 11 includes the plasma-working-gas supplying port 11a, and the oxidation-gas supplying port 11b provided at a position different from the plasma-working-gas supplying port 11a and supplying an oxidation gas G2 to the vicinity of the nozzle port 11c of the plasma torch 10 (to the area near the nozzle port 11c). The oxidation gas G2 includes, for example, steam, carbon monoxide gas, and oxygen gas. Steam is employed in this specification. By adding the steam to the plasma gas by a predetermined volume %, the plasma gas J containing the large amount of OH radical together with the plasma flame 5 are injected from the nozzle port 11c.

The expression "adding the steam (oxidation gas G2) by a predetermined volume %" as used herein means a ratio of the steam with respect to the sum total (plasma gas) of the volume of the argon gas (plasma working gas G1) and the volume of the steam. For example, in the case where the steam with the flow rate of 20 L/min is added to the plasma working gas with the flow rate of 80 L/min, the total flow rate of the plasma gas is 100 L/min. In this case, the steam is added by 20 volume %.

The concentration distribution of the OH radical (radical of oxidation gas) in the plasma gas J is illustrated in FIG. 13 as stepwise gradation for the purpose of convenience. However, it is considered that, in reality, the concentration distribution gradually changes. More specifically, the concentration distribution of the OH radical can be expressed as a normal distribution having a peak at a center of the area R illustrated in FIG. 13, when viewed in the direction from the top end of the plasma flame 5 toward the top end of the plasma gas J. Thus, the area denoted by R in FIG. 13 is an area having the largest amount of radical in the radical-rich plasma gas J. This area R is referred to as the radical rich area R in this specification and Claims.

It should be noted that the concentration distribution of the radical in the plasma gas J can be examined through an optical measurement method employing, for example, a high-speed gate camera having an image intensifier and CCD elements.

As the method for supplying the steam, it is preferable to add the steam from the vicinity of the nozzle port 11c of the anode electrode 11, in other words, from the oxidation-gas supplying port 11b provided near the nozzle port 11c as illustrated in FIG. 13. By adding the steam through the method described above, it is possible to efficiently form the radical rich area R in the plasma gas.

As another method, it may be possible to employ a method in which a nozzle of a steam (oxidation gas G2) supplying device, which is provided separately from the plasma torch 10, is disposed so as to be targeted at the plasma gas to add the steam in the plasma gas.

Figure 14:
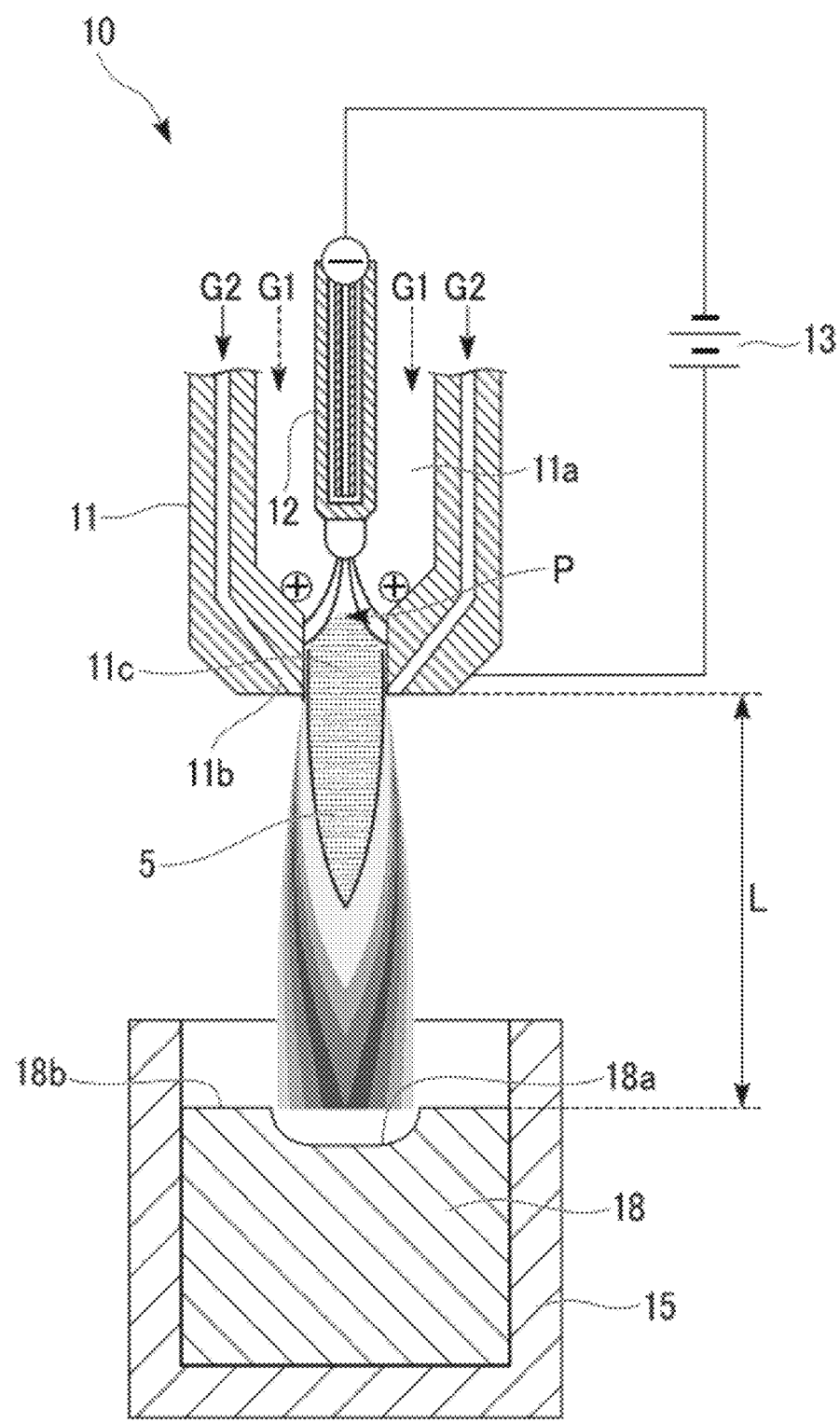
FIG. 14 is schematic sectional view illustrating a relationship of relative positions between the nozzle port of the plasma torch and the melt surface of the silicon metal in the silicon purification device according to the present invention.

FIG. 14 is schematic sectional view illustrating a relationship of relative positions of the nozzle port 11c of the plasma torch 10 and the melt surface 18b of the silicon metal 18 in the silicon purification device 1 applicable to the silicon purification method according to the present invention.

The nozzle port 11c is targeted at the crucible 15, and the distance L from the center of the top end of the nozzle port 11c of the plasma torch 10 to the melt surface 18b is adjusted such that the radical rich area R of the plasma gas J injected from the nozzle port 11c is positioned at the melt surface 18b of the silicon metal 18 in the melt state. In this embodiment, the distance L represents a distance when viewed in the direction of the plasma gas J sprayed from the nozzle port 11c, and the distance L does not necessarily indicate the shortest distance from the center of the top end of the nozzle port 11c to the melt surface 18b. In other words, in the case where the plasma gas J is injected at an angle with respect to the melt surface 18b, the distance L is naturally longer than the shortest distance. On the other hand, in the case where the plasma gas J is injected perpendicularly to the melt surface 18b, the distance L is naturally the shortest distance.

On the melt surface 18b on which the plasma gas J is sprayed, the recess 18a is formed.

By adjusting the distance L such that the radical rich area R is positioned at the melt surface 18b, the efficiency in oxidization and removal of boron or other impurities in the melt surface 18b is further enhanced.

As a mechanism of removing the boron, it is considered that, on the surface of the recess 18a formed on the melt surface 18b with the plasma gas J having the oxidation gas G2 added therein, the boron is oxidized with at least the oxidation gas G2 and radical from the oxidation gas G2 (for example, OH radical), and then, the oxidized boron is vaporized and removed.

As the oxidation gas G2, it is preferable to employ steam that can remove the impurities such as boron in the silicon metal 18 in a highly efficient manner, can handle in a relatively easy manner, and is highly safety.

The crucible 15 is disposed directly below the plasma torch 10, and contains the silicon metal 18. The silicon metal 18 may be heated with the plasma gas J into a melt state, or may be molten with another method (for example, high frequency induction heating employing an induction coil). The crucible 15 is made preferably of graphite.

As the base material of the silicon metal 18, it is preferable to employ a silicon base material used for photoelectric conversion elements of solar cell. In general, the silicon base material contains boron of about 10 ppm as an impurity, and it is desirable to purify the silicon metal such that the boron concentration is not more than 0.3 ppm.

Figure 15:
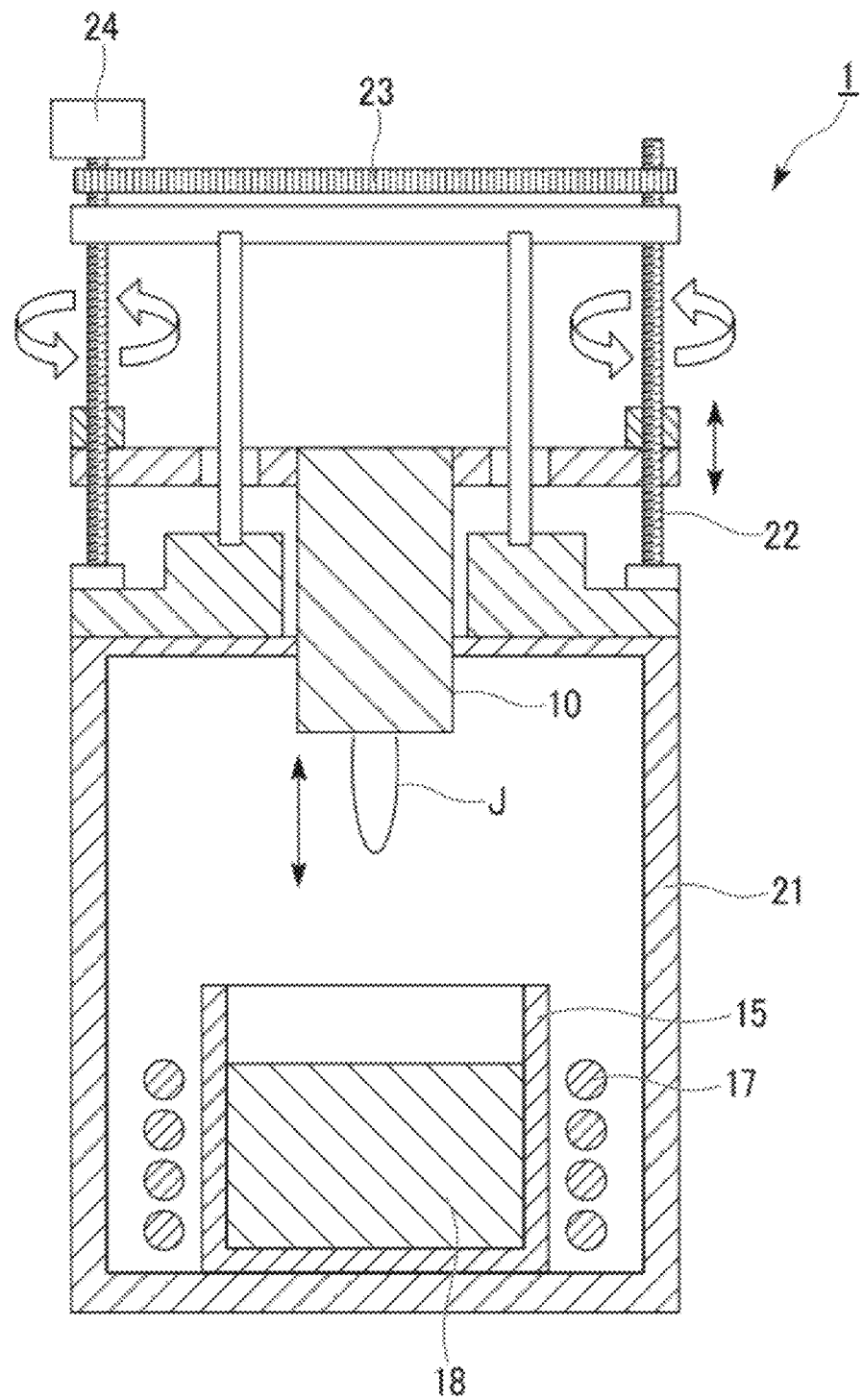
FIG. 15 is a schematic sectional view for explaining a configuration example of the silicon purification device according to the present invention, and operations thereof.

FIG. 15 is a schematic sectional view for explaining a configuration example of the silicon purification device 1 applicable to the silicon purification method according to the present invention, and operations thereof. The plasma torch 10 is disposed vertically above the crucible 15 having the induction coil 17 wound therearound, and is connected to the driving unit for moving upward and downward the plasma torch 10 in the vertical direction. The driving unit is placed on the base 21.

The driving unit in FIG. 15 includes the ball screw 22, the belt 23, and the motor 24. A driving force from the motor 24 rotates the ball screw 22 through the belt 23, and the shaft connected to the ball screw is moved upward and downward in the vertical direction. As the plasma torch 10 is connected to the shaft, by controlling the rotation of the motor 24, it is possible to bring the plasma torch 10 close to and away from the silicon metal 18 loaded in the crucible 15. In other words, by controlling the driving unit, it is possible to maintain the distance L from the center of the top end of the nozzle port 11c of the plasma torch 10 to the melt surface 18b of the silicon metal 18 to be a predetermined distance.

The silicon purification device 1 according to the present invention and having the driving unit 1 as described above operates and controls so as to keep the distance L constant during the purification of the silicon. Methods of this operation together with a procedure of purifying the silicon using the silicon purification device 1 will be described.

First, the silicon metal (base material made of the silicon metal) 18 is loaded in the crucible 15. Then, the silicon metal 18 is molten through a high frequency induction heating with the induction coil 17. The melting is determined to be complete when the silicon metal 18 reaches 1420° C. or more and no block-like silicon can be seen.

The temperature of the melt of the silicon at the time of purifying the silicon is set preferably in the range of 1500° C. to 1900° C. This is because, in the case where the temperature is less than 1500° C., the silicon melt is likely to be covered with silica ($SiO_2$) due to influence of the steam sprayed for the oxidative purification, which leads to a decrease in the speed of removing boron. On the other hand, the excessively high silicon melt temperature leads to a decrease in the speed of removing boron, and hence, it is desirable to set the temperature to 1900° C. or lower.

Next, by controlling the driving unit, the plasma torch 10 is brought close to the melt surface 18b of the silicon 18 in the melt state; the plasma torch 10 is positioned at a predetermined position; the plasma working gas G1 (Ar gas) is supplied; the oxidation gas G2 (steam) is added; and the plasma gas J is sprayed from the nozzle port 11c of the plasma torch 10 to the melt surface 18b.

At this time, by positioning the plasma torch 10 at a predetermined position so as to locate the radical rich area R of the plasma gas J at the melt surface 18b, the purification efficiency can be further improved. As the method for this, the plasma torch 10 is disposed so as to satisfy the following equation (6) between the distance L from the center of the top end of the nozzle port 11c of the plasma torch 10 to the melt surface 18b, and the flow rate V of the plasma working gas G1.

[Equation 6]

$$L = a \times V \qquad (6)$$

In the equation (6), a coefficient a represents a real number in the range of 0.75 to 2.0, a unit of L is millimeter, and a unit of V is liter/minute. The range of the coefficient a is a numerical range found as a result of study by the present inventor of the present invention.

In the case where the coefficient a is less than the lower limit value of the above-described range, the plasma gas J and the radical rich area R reach an excessively deeper position than the melt surface 18b, possibly causing the melt of the silicon 18 to spatter around. This makes it difficult to sufficiently perform the oxidative purification.

On the other hand, in the case where the coefficient a exceeds the upper limit value of the above-described range, the plasma gas J and the radical rich area R do not sufficiently reach the melt surface 18b, which makes it difficult to efficiently perform the oxidative purification.

By disposing the plasma torch 10 and spraying the plasma gas J to the melt surface 18b as described above, the recess 18a is formed on the melt surface 18b. In the recess 18a, oxidation reaction mainly occurs, and boron and other impurities are oxidized, and vaporized to be removed.

With the occurrence of vaporization as described above, the melt surface 18b gradually lowers during the oxidative purification, and the distance L gradually becomes longer. This causes the radical rich area R of the plasma gas J to be located above the melt surface 18b, reducing the efficiency in the oxidative purification. In order to suppress the reduction in the efficiency, it is preferable to control the driving unit of the silicon purification device 1 so as to make the distance L constant.

As the method for controlling the distance L, one example is given in which: the vaporization speed and the lowering speed of the melt surface 18b are examined in advance through a preliminary experiment; the lowering speed of the plasma torch 10 is set in advance on the basis of the result of the preliminary experiment; and the driving unit controls on the basis of the setting at the time of actual oxidative purification. Another method includes: preparing a distance sensor provided at the nozzle port 11c of the plasma torch 10; monitoring the distance L from the nozzle port 11c to the melt surface 18b; controlling the driving unit according to the change in the distance L; and lowering the position of the plasma torch 10.

At the time of controlling the plasma torch 10, the lowering movement of the plasma torch 10 may be performed continuously so as to correspond to the vaporization speed, or may be performed intermittently (in a stepwise manner) within the range in which the radical rich area R covers the melt surface 18b.

It should be noted that the description has been made of the case where the plasma torch 10 is moved. However, a similar effect can be obtained by moving the crucible 15 upward to keep the distance L constant. In this case, another driving unit for moving the crucible 15 is necessary.

The silicon purification device 1 illustrated in FIG. 15 is provided with a single plasma torch 10. However, the silicon purification device 1 may be provided with two or more plasma torches. By purifying the silicon metal with the plural plasma torches, the purification speed can be increased as compared with the purification with the single plasma torch.

Further, it is desirable that the flow rate of the oxidation gas G2 (steam) to be added fall in the range of 15 volume % to 40 volume % of the total flow rate of the plasma gas (sum total of the flow rate of the plasma working gas G1 and the flow rate of the added oxidation gas G2). This is because, in the case where the flow rate of the oxidation gas G2 is less than 15 volume %, the speed of removing the boron reduces, and in the case where the flow rate of the oxidation gas G2 exceeds 40 volume %, covering with silica is likely to occur, which leads to the reduction in the speed of removing boron.

Further, it is desirable to set a torch output after the addition of the oxidation gas G2 (steam) to be in the range of 3 kW/kg to 30 kW/kg per kg mass of silicon metal to be purified.

As described above, even if the melt surface 18b lowers due to the vaporization, the plasma gas J can be sprayed onto the melt surface 18b in a constant manner during the oxidative purification by keeping the distance L constant, which improves the efficiency in purifying the silicon. Further, by positioning the radical rich area R of the plasma gas J at the melt surface 18b, the oxidative purification of the impurities can be further enhanced, whereby the efficiency in purifying the silicon can be further improved.

Next, the present invention will be described using examples in more detail using Examples. However, the present invention is not limited to these examples.

In Examples 26 to 27, the base materials of the silicon metal were purified by using the silicon purification device 1 illustrated in FIG. 15.

Example 26

First, 15 kg of the base material of the silicon metal having boron with a concentration of 10 ppm was placed in a graphite crucible, and was made molten through induction heating.

Next, the plasma gas was sprayed such that: a temperature of the melt was kept at 1750° C.; the flow rate of the non-transferred type plasma working gas generated by the plasma torch having an output of 100 kW was set to 100 L/min; the flow rate of the steam to be added was set to 33.3 L/min; and the radical rich area of the plasma gas was positioned at the height of the melt surface. At this time, the distance between the spraying port of the plasma torch and the melt surface was 200 mm. As the plasma gas, an Ar gas was employed. The flow rate of the steam added from the oxidation gas supplying port of the plasma torch was set to 25 volume % of the total flow rate (133.3 L/min) of the plasma gas.

As the molten silicon gradually vaporizes and the melt surface lowers during the spraying of the plasma gas, the silicon metal was purified by monitoring the lowering of the melt surface, and lowering the position of the plasma torch according to the lowering of the melt surface so as to maintain the distance between the center of the top end of the nozzle port of the plasma torch to the melt surface to 200 mm.

After the start of the purification with the plasma gas, sampling was performed for each 30 minutes, and the purification ends after the sampling of 120 minutes.

Figure 16:
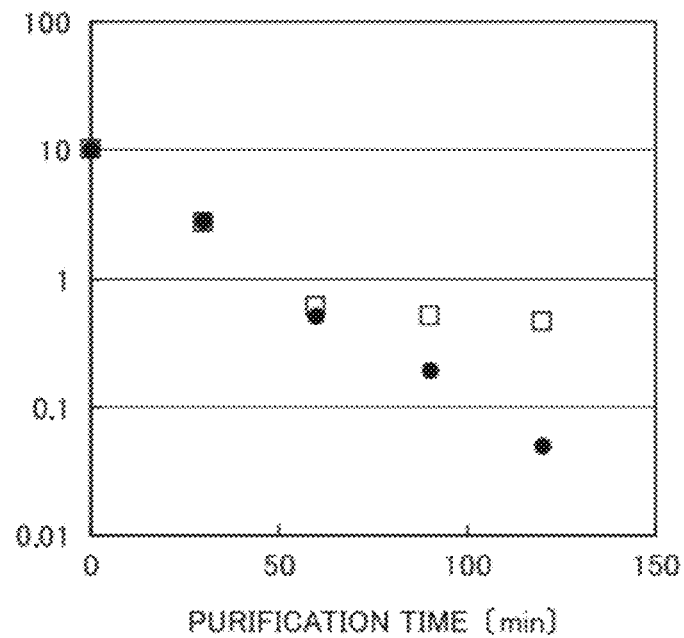
FIG. 16 is a graph showing a relationship between purification time (elapsed time from the start of purification) and the concentration of boron in the silicon.

The boron concentration in the silicon obtained through the sampling was measured with ICP-MS. Table 10 and FIG. 16 show the results.

It should be noted that, in FIG. 16, the character "●" represents measured values in Example 26, and the character "☐" represents measured values in Comparative Example, which will be described later.

TABLE 10

|  | Elapsed time from start of purification (min) | | | | |
| --- | --- | --- | --- | --- | --- |
|  | 0 | 30 | 60 | 90 | 120 |
| Boron concentration in silicon (ppm) | 10 | 2.80 | 0.51 | 0.19 | 0.05 |

From the results described above, Example 26 according to the present invention confirms that the boron concentration in silicon is 0.3 ppm or lower by setting the purification time to 90 minutes or more.

Example 27

First, 15 kg of the base material of the silicon metal having boron with a concentration of 10 ppm was placed in a graphite crucible, and was made molten through induction heating.

Next, the plasma gas was sprayed such that: a temperature of the melt was kept at 1750° C.; the flow rates V of the non-transferred type plasma working gas generated by the plasma torch having an output of 100 kW were set to 50 L/min, 100 L/min, and 200 L/min; the flow rates of the steam to be added were set to 16.7 L/min, 33.3 L/min, and 66.6 L/min; and the radical rich area of the plasma gas was positioned at the height of the melt surface. At this time, the distance L (mm) between the spraying port of the plasma torch and the melt surface was set so as to satisfy the above-described equation (6) (L=a×V), which is expressed by the product of the coefficient a and the flow rate V of the plasma working gas (L/min). As the plasma gas, an Ar gas was employed. The flow rate of the steam added from the oxidation gas supplying port of the plasma torch was set to 25 volume % of the total flow rate of the plasma gas (sum total of the flow rate of the plasma working gas and the flow rate of the steam).

As the molten silicon gradually vaporizes and the melt surface lowers during the spraying of the plasma gas, the silicon metal was purified by monitoring the lowering of the melt surface, and lowering the position of the plasma torch according to the lowering of the melt surface so as to maintain the distance between the center of the top end of the nozzle port of the plasma torch to the melt surface to the distance L satisfying the above-described equation.

As described above, the base materials of the silicon metal were separately purified under the conditions where the coefficient a was changed in the range of 0.5 to 2.5 for each of the flow rates V described above. Table 11 shows the coefficients a at this time.

Sampling was performed 120 minutes later after the start of the purification, and the purification ended.

The boron concentration in the silicon obtained through the sampling was measured with ICP-MS. The results thereof are shown in Table 11, and FIG. 17.

Figure 17:
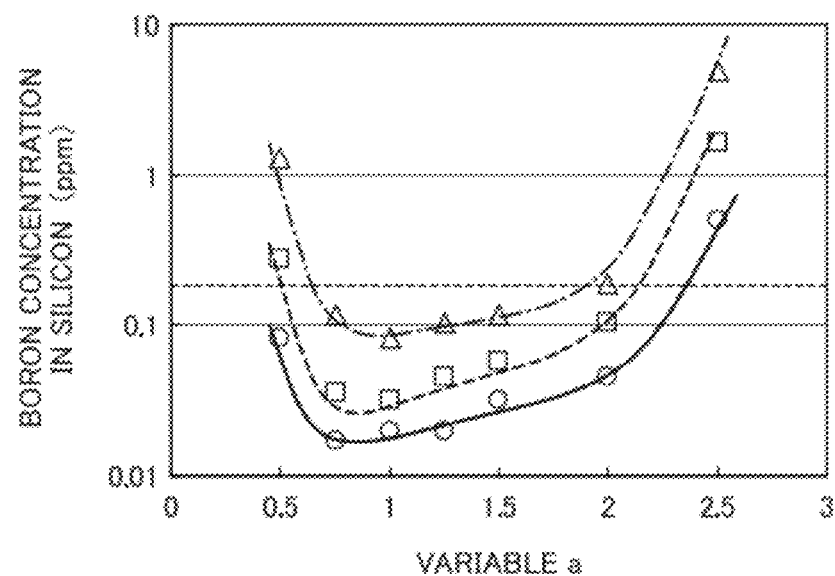
FIG. 17 is a graph showing a relationship between a variable a and the concentration of boron in silicon after the purification.

It should be noted that, in FIG. 17, the character "Δ" represents measured values obtained by setting the flow rate V of the plasma working gas to 50 L/min, the character "□" represents measured values obtained by setting the flow rate V of the plasma working gas to 100 L/min, and the character "○" represents measured values obtained by setting the flow rate V of the plasma working gas to 200 L/min.

TABLE 11

[Boron concentration in silicon (ppm)]

| | Coefficient a | | | | | | |
|---|---|---|---|---|---|---|---|
| | 0.5 | 0.75 | 1.0 | 1.25 | 1.5 | 2.0 | 2.5 |
| Flow rate V = 50 (L/min) | 0.08 | 0.02 | 0.02 | 0.02 | 0.03 | 0.05 | 0.50 |
| Flow rate V = 100 (L/min) | 0.27 | 0.04 | 0.03 | 0.05 | 0.06 | 0.10 | 1.65 |
| Flow rate V = 200 (L/min) | 1.30 | 0.12 | 0.08 | 0.10 | 0.12 | 0.19 | 4.87 |

From the results described above, Example 27 according to the present invention confirms that the boron concentration in silicon is less than or equal to 0.3 ppm by setting the coefficient a in the rage of 0.75 to 2.0 in the case where the purification time is set to 120 minutes for each of the flow rates V of the plasma working gas.

Comparative Example 8

First, 15 kg of the base material of the silicon metal having boron with a concentration of 10 ppm was placed in a graphite crucible, and was made molten through induction heating.

Next, the plasma gas was sprayed such that: a temperature of the melt was kept at 1750° C.; the flow rate of the non-transferred type plasma working gas generated by the plasma torch having an output of 100 kW was set to 100 L/min; the flow rate of the steam to be added was set to 33.3 L/min; and the radical rich area of the plasma gas was positioned at the height of the melt surface. At this time, the distance between the center of the top end of the nozzle port of the plasma torch and the melt surface was set to 200 mm at the time of starting the purification. As the plasma gas, an Ar gas was employed. The flow rate of the steam added from the oxidation gas supplying port of the plasma torch was set to 25 volume % of the total flow rate of the plasma gas (133.33 L/min).

Although the molten silicon gradually vaporizes and the melt surface lowers during the spraying of the plasma gas, the silicon metal was purified by fixing the position of the plasma torch to the position thereof at the time of starting the purification.

After the start of the purification with the plasma gas, sampling was performed for each 30 minutes, and the purification ends after the sampling of 120 minutes. The distance between the spraying port of the plasma torch and the melt surface was 240 mm at the end of the purification.

The boron concentration in the silicon obtained through the sampling was measured with ICP-MS. Table 12 and FIG. 16 show the results.

It should be noted that, in FIG. 16, the character "●" represents measured values in Example 26, and the character "□" represents measured values in Comparative Example.

TABLE 12

| | Elapsed time from start of purification (min) | | | | |
|---|---|---|---|---|---|
| | 0 | 30 | 60 | 90 | 120 |
| Boron concentration in silicon (ppm) | 10 | 2.66 | 0.60 | 0.50 | 0.45 |

From the results described above, it is obvious that the silicon purification method according to the present invention improves the efficiency in purifying the silicon as compared with the convention method.

| Reference Signs List | |
|---|---|
| 1 | silicon purification device |
| 5 | plasma flame |
| 7 | virtual circle A |
| 10 | plasma torch |
| 11 | anode electrode |
| 11a | plasma-working-gas supplying port |
| 11b | oxidation-gas supplying port, steam supplying port |
| 11c | nozzle port |
| 12 | cathode electrode |
| 13 | direct-current power supply |
| 15 | crucible |
| 17 | induction coil |
| 18 | silicon metal |
| 18a | recess |
| 18b | melt surface |
| 21 | base of plasma torch driving unit |
| 22 | ball screw |
| 23 | belt |
| 24 | motor |
| 26 | torch holder |
| 27 | arm |
| 28 | belt |
| 29 | motor |
| θ | elevation angle |
| h | major axis |
| i | minor axis |
| L | radius of melt surface in crucible |
| l | radius of virtual circle |
| C | center of the virtual circle |
| P | plasma arc |
| J | plasma gas, plasma gas containing the large amount of radical |
| R | radical rich area |
| G1 | plasma working gas |
| G2 | oxidation gas, steam |

What is claimed is:

1. A method for purifying silicon using a silicon, purification device having at least a crucible for loading a silicon metal and a plurality of plasma torches, the method including:

purifying the silicon metal by injecting a plasma gas from the plasma torches toward a melt surface of the silicon metal loaded in the crucible in a state where an angle formed by the melt surface and the plasma gas is set to be in the range of 20° to 80°;

spraying the plasma gas from the plasma torches so as to form a plurality of recesses on the melt surface;

causing a circulation flow of the melt surface;

spraying the plasma gases from the respective plasma torches in a tangential direction of a virtual circle A having the recesses on a circumference of the virtual circle A in a manner such that the plasma gases are aligned in one direction of the circumference of the virtual circle A; and spraying the plasma gases so as to satisfy the following equation (1), where l is a radius of the virtual circle A, L is a radius of a virtual circle B having a center same as the virtual circle A and inscribed in an outer circumference of the melt surface, and i is a diameter of the recesses in a direction perpendicular to a tangent line of the virtual circle A $$3i \leq l \leq L - 3i. \tag{1}$$

2. The method for purifying silicon according to claim 1, further including:

controlling a melt temperature of the silicon metal to be in the range of 1700° C. to 1900° C. when steam is added to the plasma gas to purify the silicon metal.

3. The method for purifying silicon according to claim 2, wherein the crucible is made of a material containing graphite as a main component.

4. The method for purifying silicon according to claim 2, wherein a ratio of a flow rate of the steam added to the plasma gas relative to the total flow rate of the plasma gas is in the range of 15 volume % to 40 volume %.

5. The method for purifying silicon according to claim 1, further including:

injecting the plasma gas from a nozzle port of the plasma torch; and keeping constant a distance from a center of a top end of the nozzle port to the melt surface in a direction of the plasma gas injected from the nozzle port.

6. The method for purifying silicon according to claim 5, wherein the silicon metal is purified by keeping the distance constant such that a radical rich area of the plasma gas is positioned at the melt surface.

7. The method for purifying silicon according to claim 5, wherein the following equation (2) is satisfied, where L is the distance, and V is a working-gas flow rate of the plasma gas $$L = a \times V \tag{2}$$

(in said equation (2), the coefficient a represents a real number in the range of 0.75 to 2.0, a unit of L is millimeter, and a unit of V is liter/minute).

* * * * *